Nov. 1, 1966 R. C. AVERY 3,283,078

TELEPHONE CALL CHARGE DETERMINATION SYSTEM

Filed Nov. 5, 1963 18 Sheets-Sheet 1

INVENTOR
R. C. AVERY
BY Kenneth B. Hamlin
ATTORNEY

Nov. 1, 1966 R. C. AVERY 3,283,078

TELEPHONE CALL CHARGE DETERMINATION SYSTEM

Filed Nov. 5, 1963 18 Sheets-Sheet 2

Nov. 1, 1966 R. C. AVERY 3,283,078

TELEPHONE CALL CHARGE DETERMINATION SYSTEM

Filed Nov. 5, 1963 18 Sheets-Sheet 5

TELEPHONE CALL CHARGE DETERMINATION SYSTEM

Filed Nov. 5, 1963 18 Sheets-Sheet 6

TELEPHONE CALL CHARGE DETERMINATION SYSTEM

Filed Nov. 5, 1963 18 Sheets-Sheet 8

Nov. 1, 1966 R. C. AVERY 3,283,078

TELEPHONE CALL CHARGE DETERMINATION SYSTEM

Filed Nov. 5, 1963 18 Sheets-Sheet 11

Nov. 1, 1966 R. C. AVERY 3,283,078

TELEPHONE CALL CHARGE DETERMINATION SYSTEM

Filed Nov. 5, 1963 18 Sheets-Sheet 12

TELEPHONE CALL CHARGE DETERMINATION SYSTEM

Filed Nov. 5, 1963 18 Sheets-Sheet 15

TELEPHONE CALL CHARGE DETERMINATION SYSTEM

Filed Nov. 5, 1963 18 Sheets-Sheet 16

United States Patent Office 3,283,078

Patented Nov. 1, 1966

3,283,078

TELEPHONE CALL CHARGE DETERMINATION SYSTEM

Robert C. Avery, Jackson Heights, N.Y., assignor to Bell Telephone Laboratories, Incorporated, New York, N.Y., a corporation of New York Filed Nov. 5, 1963, Ser. No. 321,598

15 Claims. (Cl. 179—9)

This invention relates to automatic telephone switching systems and more particularly to arrangements for determining toll call charges in such systems.

In telephone systems utilizing automatic message accounting, a record is made at a central or toll switching office of certain items of information pertaining to each toll call. These items of information may include the identity of the calling subscriber, the identity of the called subscriber, the time and date the call connection is completed, and the time the connection is terminated. Subsequently these records from a number of switching offices are taken to an automatic message accounting center where the various items of information are sorted and processed to determine the charges for each toll call. The charges for the individual toll calls are then collated and, in conjunction with the other items of information pertaining thereto, are used in printing the subscriber's periodic statement of charges.

This arrangement for determining toll call charges is perfectly suitable in most instances. However, no provision is made for those call situations in which a determination of the call charges is desired by an operator or by the calling party immediately after the call is terminated. This type of service is requested, for example, with respect to calls originating from hotels and similar establishments, where the calling party may be obliged to pay the charges for the call before the normal periodic statement becomes available to the hotel. Existing telephone practices provide for routing these calls through toll operators who manually time and ticket the call and communicate the charges therefor to the hotel. In automatic telephone switching systems it is desirable to minimize both the necessity and the time required for such operator assistance in the handling of calls. It would be clearly advantageous, therefore, to provide apparatus for automatically determining the call charges and for communicating the charges to the hotel immediately upon termination of the call.

Further, automatic determination of toll call charges would be advantageous with respect to coin phone calls and with respect to operator-completed toll calls where the calling party requests the charges. These charges are presently determined by the operator through reference to voluminous printed material which is time-consuming and often leads to customer annoyance. Automatic determination of toll call charges and display thereof to the operator would minimize the time required for operator assistance and would improve the service to the customer.

Accordingly, it is a general object of this invention to provide a new and improved automatic call charge determination system.

More particularly, it is an object of this invention to provide a simple, compact and economical arrangement for automatically determining charges with respect to an individual call immediately upon termination of the call.

It is a further object of this invention to provide a simple, compact and economical arrangement for automatically determining the charges for an individual call and for automatically transmitting the charges to the calling subscriber or to an operator's position.

Another object of this invention is to provide a call charge determination system requiring a minimum of circuitry individual to each trunk circuit, thus minimizing the size and cost of the equipment which must be duplicated in large quantities.

Yet another object of this invention is to provide a call charge determination system utilizing electronic circuitry which is fast in operation, thereby requiring a minimum amount of common circuitry for handling large numbers of calls.

In telephone systems utilizing automatic message accounting, as mentioned above, the call records from a number of switching offices are periodically taken to an accounting center where the various recorded items of information are sorted and processed to determine the charges for each call. The charge determination at the accounting center is rather slow and expensive due in part to the large memory capacity required to provide for the numerous combinations of calling and called offices. Accordingly, another object of this invention is to provide a simple and inexpensive arrangement which may be located at the switching office for automatically determining the charges for each toll call immediately upon termination of the call and for recording the charges, along with the other items of information pertaining to the call, thereby substantially reducing the memory capacity and eliminating a considerable part of the processing subsequently required at the accounting center.

The above and other objects are attained in an illustrative embodiment of the present invention wherein a simple register circuit individual to each trunk circuit is employed to register the initial items of information pertaining to the establishment of a single toll call connection, such information including the identities of the calling and called subscribers and the time and date the connection is established. The time and date information is provided by a clock circuit common to a plurality of trunk circuits. These initial items of information remain registered in the trunk register circuit for the duration of the call connection; and upon termination of the connection, the information is transferred to common buffer register circuitry, thus releasing the trunk circuit for subsequent calls. The time and date of termination of the call is directly registered in the buffer register circuit by the clock circuit. The contents of the buffer register are applied to a charge translator or computer circuit which determines the charges for the call and registers the charges in the buffer register circuit along with the other information pertaining to the call.

Steering circuitry associated with the buffer register circuit transfers the information therein to the appropriate output circuitry in accordance with the class of service of the call. If the call is from a hotel or similar establishment, the information including the call charges is directed to circuitry for transmitting it to the hotel. If the call is operator-served, the information including the charges is directed to display circuitry at the operator's position. In any event, the information in the buffer register is also directed to recorder circuitry for producing a permanent and complete record of the individual call connection which is utilized subsequently in making up the calling subscriber's periodic statement of charges.

In accordance with an aspect of the present invention the register circuitry employed individual to each trunk circuit and in the buffer register circuitry utilizes inexpensive breakdown gas diodes, such as neon tubes, for binary registration of the information pertaining to a call. The trunk registers and the buffer register and computer circuitry are interconnected in parallel via common information transfer busses. Actuator electrodes positioned adjacent the gas diodes of each register are selectively energized to select the respective register in which information pertaining to a call is to be registered.

In addition to the advantageous determination and transmission of the call charges to a calling subscriber such as a hotel or to an operator's position immediately upon termination of the call, the present circuit arrangement is sufficiently simple, compact and inexpensive to permit installation and use advantageously at local and toll switching centers. The equipment which must be duplicated for each trunk circuit is reduced to the bare minimum inasmuch as each trunk circuit requires individual thereto only a simple register circuit of sufficient capacity to register the items of information pertaining to the establishment of a single call. Register capacity for subsequent items of information pertaining to the call is not duplicated in each of the plurality of trunk circuits, but rather is provided in buffer register circuitry which is common to the plurality of trunk circuits. Each of the trunk circuits is selectively interconnected via a common bus arrangement with the clock circuit, the buffer register and computer circuitry, and the output circuitry, all of which is common to the plurality of trunk circuits. The common clock circuit eliminates any requirement for timing circuitry individual to each trunk circuit. Moreover, the buffer register and computer circuitry requirements are minimized inasmuch as this common circuitry is seized only once for each call connection, that is, only upon termination of the call connection, and remains seized only until the charge for the call has been provided by the computer and the call information transferred to the output circuitry.

Further, by producing a complete record of each call connection at the switching center, the present circuit arrangement advantageously eliminates a considerable portion of the processing subsequently required at the accounting centers to make up the periodic statements of charges. The processing at the accounting center is reduced essentially to collating the individual call connection records by calling subscriber and to printing the resultant statement of charges for each subscriber. Consequently, the equipment and the memory capacity required at the accounting center is substantially reduced, as is the time and expense involved in the preparation of the periodic statements of charges.

These and other objects and features of this invention may be better understood upon consideration of the following detailed description and the accompanying drawing in which:

FIGS. 1 and 2, when FIGS. 1 is arranged to the left of FIG. 2, comprise a block diagram representation of a call charge determination system in accordance with the principles of the present invention;

FIGS. 3 through 18 comprise a schematic diagram of a specific illustrative embodiment of the present invention; and FIG. 19 shows the arrangement of FIGS. 3 through 18.

GENERAL DESCRIPTION

The illustrative embodiment of the present invention is depicted in a telephone system of the crossbar type generally represented in block diagram form in FIGS. 1 and 2 of the drawing. In FIG. 1, for example, the various telephone circuits comprising subscriber substation 100, line link frame 110 trunk link frame 120, originating register 123, marker 125, trunk circuits 130 and senders 150 are, in general, similar to the corresponding circuits disclosed in A. J. Busch Patent 2,585,904, issued February 19, 1952. The trunk circuits and senders are modified slightly in the present invention to include circuitry for controlling the registration of certain items of information pertaining to each call, as will be described in detail hereinbelow. The present invention is not, however, limited in its application to the particular telephone system shown but is generally applicable to all automatic telephone systems.

As set forth in the above-identified Busch patent, every subscriber line appears on one of a plurality of line link frames and every trunk circuit and originating register appears on one of a plurality of trunk link frames. Thus, in FIG. 1 subscriber substation 100 is connected via subscriber line 101 to line link frame 110, and originating register 123 and uppermost trunk circuit 130 are connected to trunk link frame 120. The control equipment, including marker 125 and senders 150, is utilized in common to set up the various connections necessary to establish a call connection. Briefly the operation of the switching system in establishing an illustrative call connection is as follows: When subscriber substation 100 goes off hook, marker 125 is engaged vie connector 112 to connect calling subscriber line 101 temporarily to an idle originating register 123 through line link frame 110 and trunk link frame 120, after which marker 125 is released. When the necessary information designating the called subscriber has been dialed at subscriber substation 100 and registered in originating register 123 along with information designating the calling subscriber and the class of service, a marker (here assumed to be marker 125) is again engaged and receives the information registered in register 123. Assuming the call is to a subscriber located in an office outside the calling subscriber's office, marker 125 recognizes this from the information dialed and proceeds to connect calling line 101 through line link frame 110 and trunk link frame 120 to an appropriate outgoing trunk circuit, such as uppermost trunk circuit 130 in FIG. 1 of the drawing. Marker 125 also, via connector 127, seizes an idle one of senders 150 and connects it to trunk circuit 130 through sender link 135. The information registered in marker 125 is then transferred to sender 150. Marker 125 is released and sender 150 operates to transmit the information in the form of pulses via trunk circuit 130 toward the terminating office in which the called subscriber is located. Upon receipt of the information, the common control equipment at the terminating office tests the called line and, assuming it is found to be idle, seizes it for the call. When the call is answered by the called subscriber a supervisory relay is energized in trunk circuit 130 which remains energized until the call connection is released or terminated by one of the parties.

In accordance with the present call charge determination system, an individual trunk register circuit 131 is associated with each trunk circuit 130 to register certain items of information pertaining to the establishment of a toll call connection. Each trunk register circuit 131 is connected to a common initial entry bus IEB and to a common answer entry bus AEB. Each sender 150 is also connected to initial entry bus IEB. Trunk register circuits 131 and senders 150 are interconnected via preference circuitry (not shown in FIG. 1) such that only a single trunk register circuit 131 and a single sender 150 can gain access to initial entry bus IEB at one time, and such that only one trunk register circuit 131 can gain access to answer entry bus AEB at one time.

During the establishment of the illustrative call connection described briefly above, information designating the called and calling subscribers and the class of service of the call is transferred by marker 125 to one of senders 150. Senders 150 are each modified, as will be described in detail below, to include circuitry for providing this information to initial entry bus IEB. Trunk register circuit 131, associated with trunk circuit 130 selected by marker 125 for completion of the call connection, is enabled to receive and register the information provided on initial entry bus IEB by sender 150. All other trunk register circuits connected to bus IEB, associated with nonselected trunk circuits, remain disabled and do not register the information from sender 150 for the particular call in progress. When this initial information pertaining to the call has been registered by trunk register circuit 131, initial entry bus IEB is released for use on calls over other trunk circuits.

As mentioned above, sender 150 pulses the call information to the terminating office over trunk circuit 130 and, if the called line is idle, it is seized for the call. When the called subscriber answers, a supervisory relay in trunk circuit 130 (not shown in FIG. 1) is energized and remains energized until one of the parties terminates the call connection. Energization of the supervisory relay provides an answer signal on bus AD to clock circuit 220; and, conversely, release of the supervisory relay provides a disconnect signal on bus AD. Clock circuit 220 includes clock 221 for continuously providing a digital indication of the time and date, which indication is selectively directed over bus AE to answer entry bus AEB or over bus DE to disconnect entry bus DEB in accordance with respective answer or disconnect signals on bus AD from one of the plurality of trunk circuits 130. Thus when the called subscriber answers, the answer signal on bus AD to clock circuit 220 directs a digital indication over bus AE to answer entry bus AEB of the time and date of completion of the call connection. Trunk register circuit 131 is enabled by trunk circuit 130 to register the answer time and date information appearing on bus AEB.

The times of information thus registered in trunk register circuit 131 designate the calling and called subscribers, indicate the class of service of the call, and include the time and date of completion of the call connection. This initial and answer information remains registered in trunk register circuit 131 for the duration of the call over associated trunk circuit 130. No additional information pertaining to the call is registered in trunk register circuit 131.

When one of the parties releases the call connection, it is desirable to release trunk circuit 130 and its associated register 131 as soon as possible for use on future calls. Accordingly, buffer register circuitry is employed comprising a plurality of buffer and steering circuits 230, each including an individual buffer register 231, to temporarily register the call information until the charge for the call is determined and the information is transferred to output circuitry. Buffer and steering circuits 230 are connected in common to initial entry bus IEB1, answer entry bus AEB1, disconnect entry bus DEB and charge entry bus CEB. Buffer and steering circuits 230 are interconnected via preference circuitry (not shown in FIG. 2) such that only a single buffer register 231 can gain access to individual ones of busses IEB1, AEB1, DEB and CEB at the same time.

Thus in accordance with the present invention, when the supervisory relay in trunk circuit 130 releases to indicate release of the call connection, the initial and answer information registered in trunk register 131 is read out in parallel on initial entry bus IEB and answer entry bus AEB. Transfer connector circuit 200 is enabled to connect busses IEB and AEB with busses IEB1 and AEB1, respectively. At the same time, trunk circuit 130 provides a disconnect signal on bus AD to clock circuit 220, thereby directing an indication on bus DE to disconnect entry bus DEB of the time and date of termination of the call connection. An idle one of buffer registers 231 is enabled to register the information on busses IEB1, AEB1, and DEB, whereupon trunk circuit 130 and register 131 are released and restored to their idle condition for handling subsequent toll call connections.

It will be recalled that incident to the establishment of a call connection the designation of the calling subscriber is provided by marker 125 to sender 150, which in turn provides it along with the other initial items of information over bus IEB to trunk register 131. A subscriber line is normally designated by an equipment number specifying its line link frame location, which designation has no fixed relationship to the subscriber's directory number. The subscriber's directory number is, however, required for billing purposes. In certain switching offices arranged for automatic message accounting, the calling subscriber's equipment number is translated into the corresponding directory number; and the latter designation is registered in sender 150 during the establishment of the call. Consequently, it is this directory number designation for the calling subscriber which is registered with the initial items of information in trunk register circuit 131, and which is subsequently transferred via transfer connector circuit 200 to buffer register 231. In switching offices where the equipment number, rather than the directory number, is registered in sender 150 during establishment of the call connection, and thus in trunk register circuit 131, translator 202 is provided in transfer connector circuit 200 to convert the equipment number into the directory number of the calling subscriber during subsequent transfer of the information from trunk register 131 to buffer register 231. Thus, in either instance, the information appearing on busses IEB1, AEB1 and DEB and which is registered in buffer register 231 includes the directory numbers of both the calling and the called subscribers, the time and date of completion of the call connection therebetween, and the time and date of termination of the call connection.

Assuming charge computer 250 to be idle, the initial answer and disconnect information registered in buffer register 231 is nondestructively read out by buffer and steering circuit 230 on busses IEB1, AEB1 and DEB and applied to charge computer 250. Responsive to the call information on busses IEB1, AEB1 and DEB, charge computer 250 computes the charges for the call provides an indication thereof on charge entry bus CEB for registration in buffer register 231. Upon registration of the charge information, buffer and steering circuit 230 transfers this along with the other information registered in buffer register 231 over busses IEB1, AEB1, DEB and CEB, via output connector circuit 260 to the appropriate output circuits in accordance with the class of service of the call. If the call is from a hotel or similar establishment, the information including the call charges is directed by output connector circuit 260 to charge communication transmitting equipment 270 for transmission to charge communication receiving equipment 107 at the hotel. Transmitting equipment 270 and receiving equipment 107 may, for example, advantageously comprise teletypewriter equipment for this purpose.

If the call is operator-served, the information is directed by output connector circuit 260 to operator position circuit 280. There the charges for the call and the necessary information for identifying the calling subscriber and called subscriber are displayed to the operator handling the call, who may then relate the charges to the calling subscriber.

In any event, output connector circuit 260 also directs the information to recorder 290 for producing a complete and permanent record of the individual toll call connection. For example, recorder 290 may comprise known apparatus for producing a magnetic tape record thereof. This record is utilized subsequently in making up the calling subscriber's periodic statement of charges. In accordance with the present invention, all of the information pertaining to an individual call is recorded contiguously on the tape, and thus the subsequent processing is reduced essentially to collating the call records by calling subscriber's directory numbers, adding the charges and printing the billing statement.

Each of information busses IEB, AEB, IEB1, AEB1, DEB and CEB is connected via a respective one of check busses IET, AET, IET1, AET1, DET and CET to check circuit 210 and therethrough to trouble recorder 215. Any information appearing on the information busses is thus applied to check circuit 210 and trouble recorder 215. If an error is detected in the information pertaining to a call, check circuit 210 initiates a trouble release of the call charge determination system to preclude erroneous charges on the call and initiates operation of trouble recorder 215 to record the call information. Each trunk circuit 130, each sender 150, and each buffer and steering circuit 230 is connected via a respective one of common identification busses TN, SN and BN through check circuit 210 to trouble recorder 215. In the event that a trouble record is made on a call, the identities of the trunk, sender, and buffer and steering circuits involved are provided over the respective identification busses for inclusion in the trouble record for maintenance purposes.

In brief summary, therefore, a simple register individual to each trunk circuit registers the items of information, including the time, pertaining to the establishment of a toll call connection over the trunk; upon release of the call connection, these items of information are transferred to a buffer register, along with the time of release; the information registered in the buffer register is applied to a computer circuit which computes the call charges therefrom and registers the charges in the buffer register; and all of the call information, inclusive of charges, is provided to recording circuitry and to output circuitry for communication to the calling subscriber or to an operator. A more complete and comprehensive description of a specific illustrative embodiment in accordance with the principles of the present invention will be found hereinbelow in the detailed description of the schematic diagram depicted in FIGS. 3 through 18, when arranged as shown in FIG. 19.

DETAILED DESCRIPTION

Figure 1:
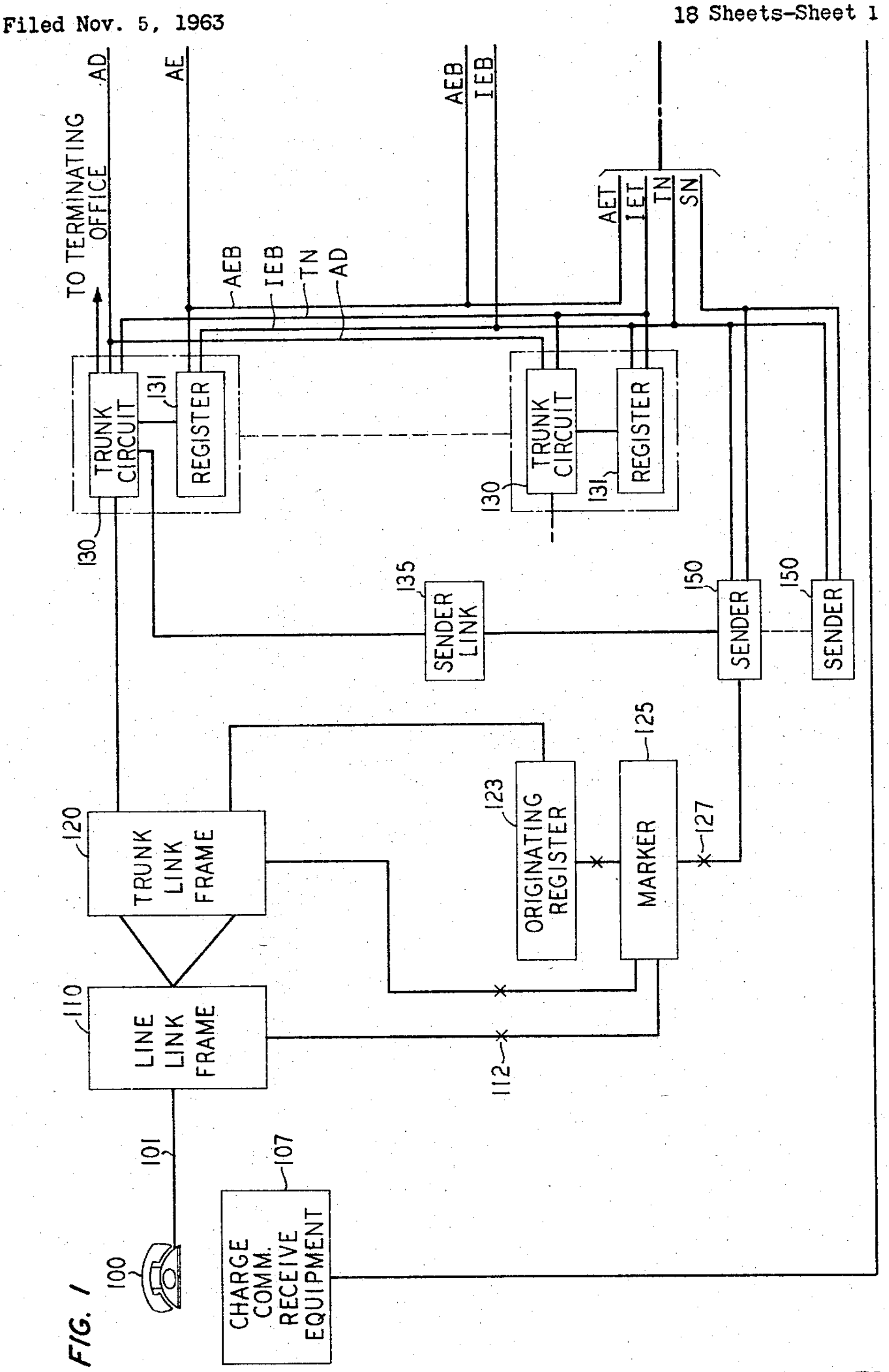

In the specific embodiment set forth in FIGS. 3 through 18, the number preceding the functional designation of each of the various elements indicates the figure in which the particular element is located, or indicates one of the figures arbitrarily where the element extends over several figures. The relay circuitry is shown in well-known detached contact form to permit greater clarity and to facilitate description, a relay coil being represented by a block, a make contact being represented by a pair of short lines intersecting on a conductor, and a break contact being represented by a single short line perpendicularly intersecting a conductor. The relay coils are designated in a manner similar to the other elements in FIGS. 3 through 18. Each relay contact is designated by the designation of its controlling relay coil and, additionally, by a number individual to the contact.

Important objects of the present invention relate to the provision of call charge determination apparatus which is simple, compact and economical to manufacture and to maintain. These objects are attained in the illustrative embodiment through the use of circuitry employing four-layer semiconductor switches and breakdown gas diodes. Illustratively, the gas diodes may be of the well-known neon diode gas tube type. A characteristic of such neon diodes is that a minimum threshold voltage must be applied across the electrodes of the diode before the diode will break down to provide a conductive path by ionization of the gas therein. Once the diode has broken down, a voltage somewhat less than the threshold voltage will sustain the conductive path through the diode. When the voltage across the electrodes of the diode falls below the sustaining voltage, the diode ceases to conduct.

Several types of semiconductor switches are employed in the illustrative embodiment, differing in the polarity of gating potential required for switching and in their "locking" characteristics. Illustrative of the positive gate type of switch is switch 3ARL1 in which a low impedance conducting path is provided between anode electrode *a* and cathode electrode *c* thereof when the potential applied to gate electrode *b* is more positive than the potential applied to cathode electrode *c*. Illustrative of the negative gate type of switch is switch 3AES in which a low impedance conducting path is provided between the anode and cathode electrodes thereof when the potential applied to gate electrode *b* is more negative than the potential applied to anode electrode *a*. Certain of the switches employed continue to provide a low impedance conducting path after the gate potential is removed and until the signal applied across the anode and cathode electrodes is removed; i.e., they have "locking" characterstics. Switch 3ARL is illustrative of this type of switch, which is indicated in the drawing by a shaded anode electrode.

The several semiconductor switches employed in the illustrative embodiment each have a respective resistor connected between the gate electrode and either the anode or the cathode electrode of the switch. For example, resistor 312 is connected between the gate electrode and the cathode electrode of switch 3ARL1, and resistor 303 is connected between the gate electrode and the anode electrode of switch 3AES. The resistor is not essential to the operation of the respective switch, but it prevents false operation thereof by maintaining a fixed potenial relationship between the gate electrode and the other electrode of the switch to which the resistor is connected Thus parallel paths are defined for the gating current for each switch, one through the switch inself and the other through the respective resistor connected thereacross. However, for the purposes of facilitating the description of switching operation hereinbelow, the gating path will be traced through the resistor, the parallel path through the respective switch for effecting its operation being readily apparent in each instance.

Figure 2:
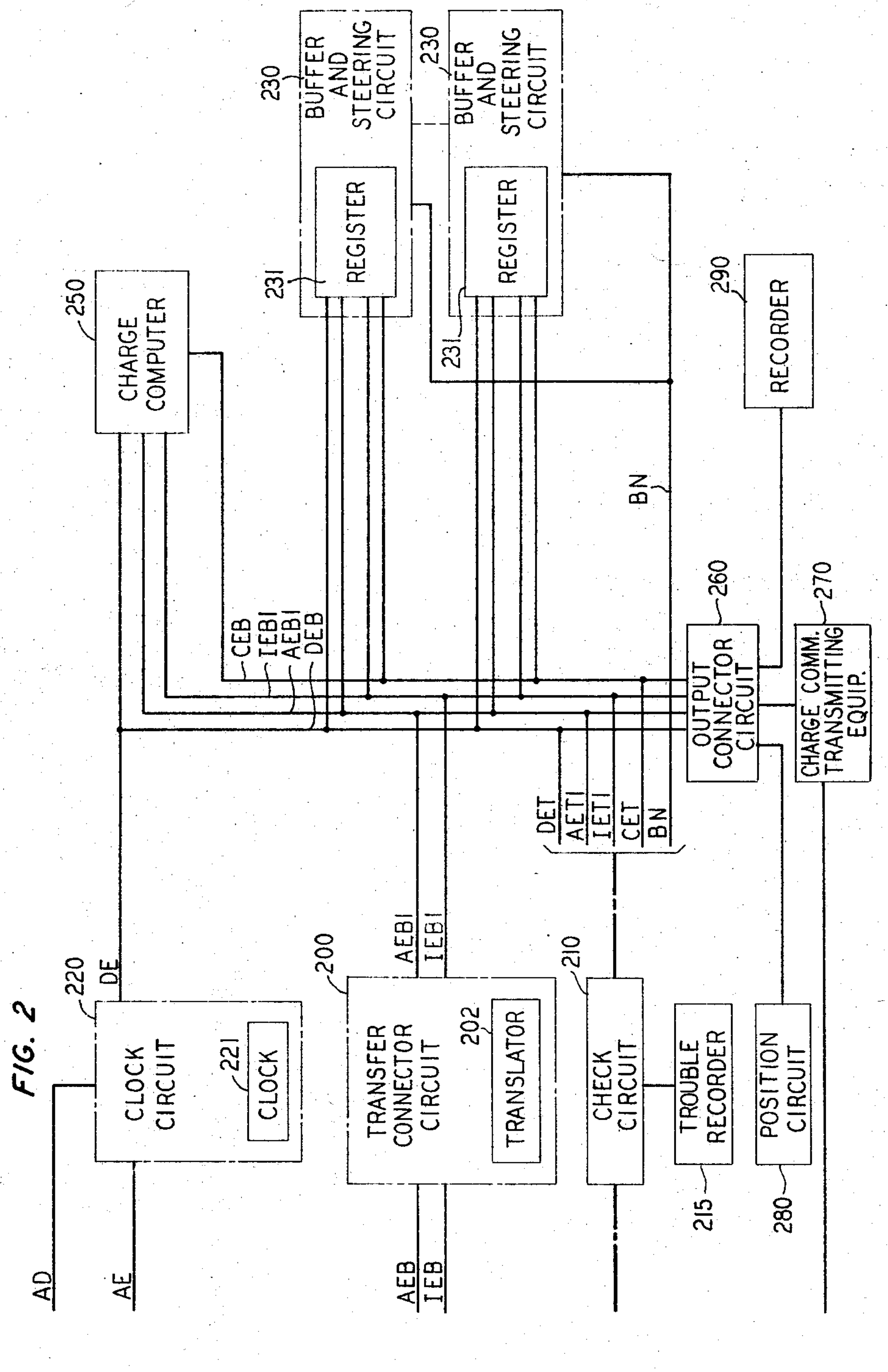
Figure 3:
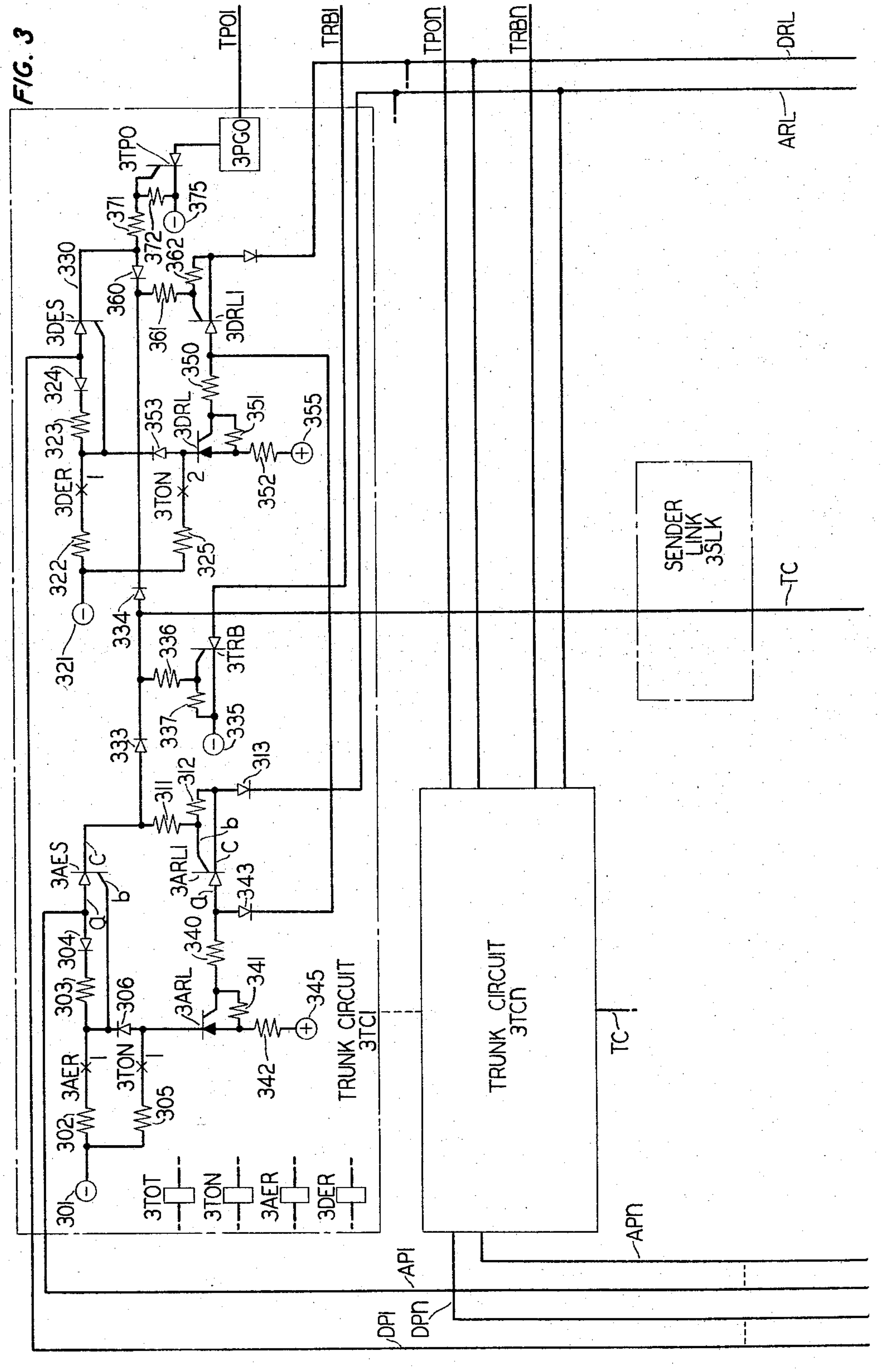
Figure 4:
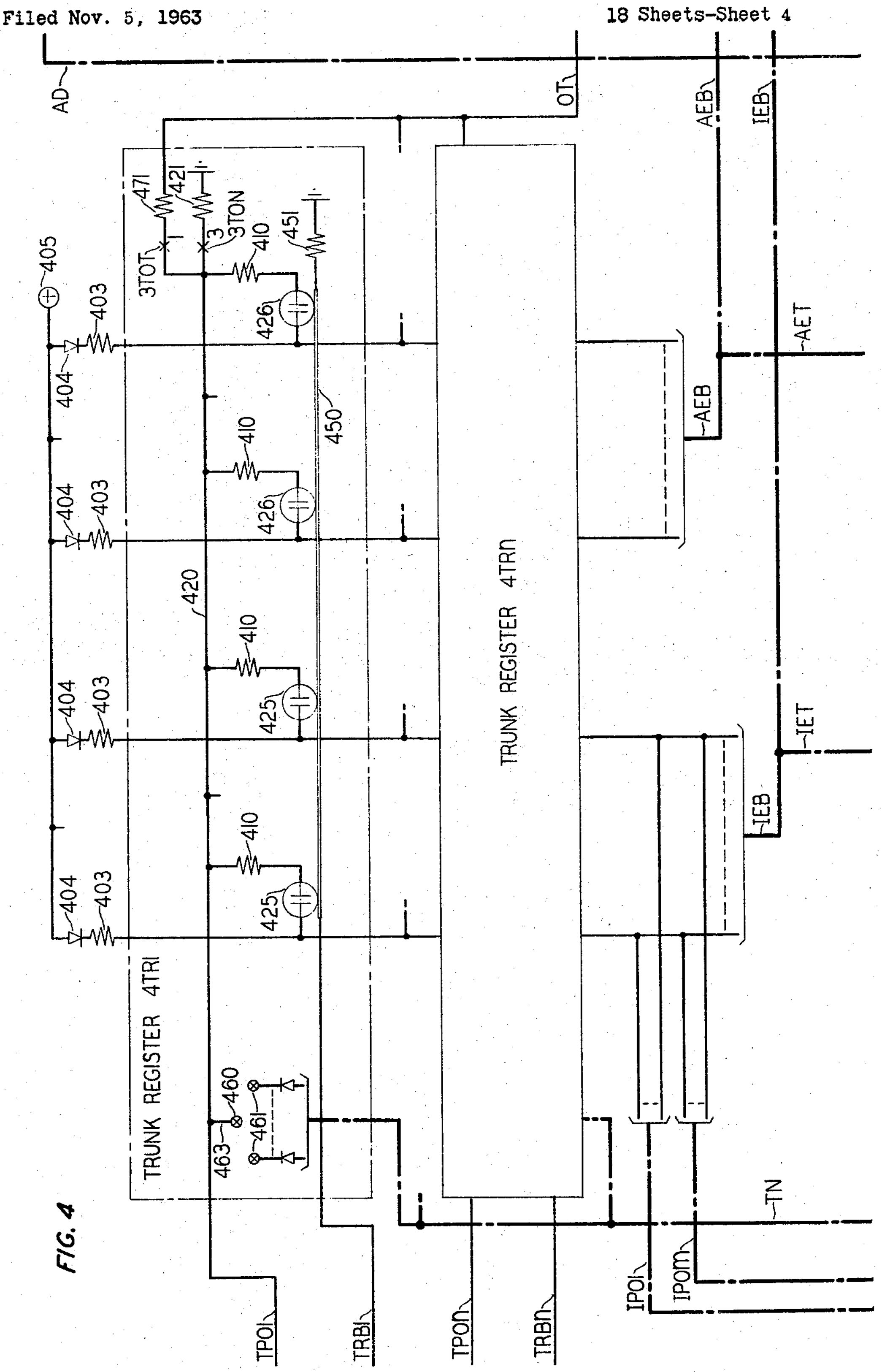
Figure 5:
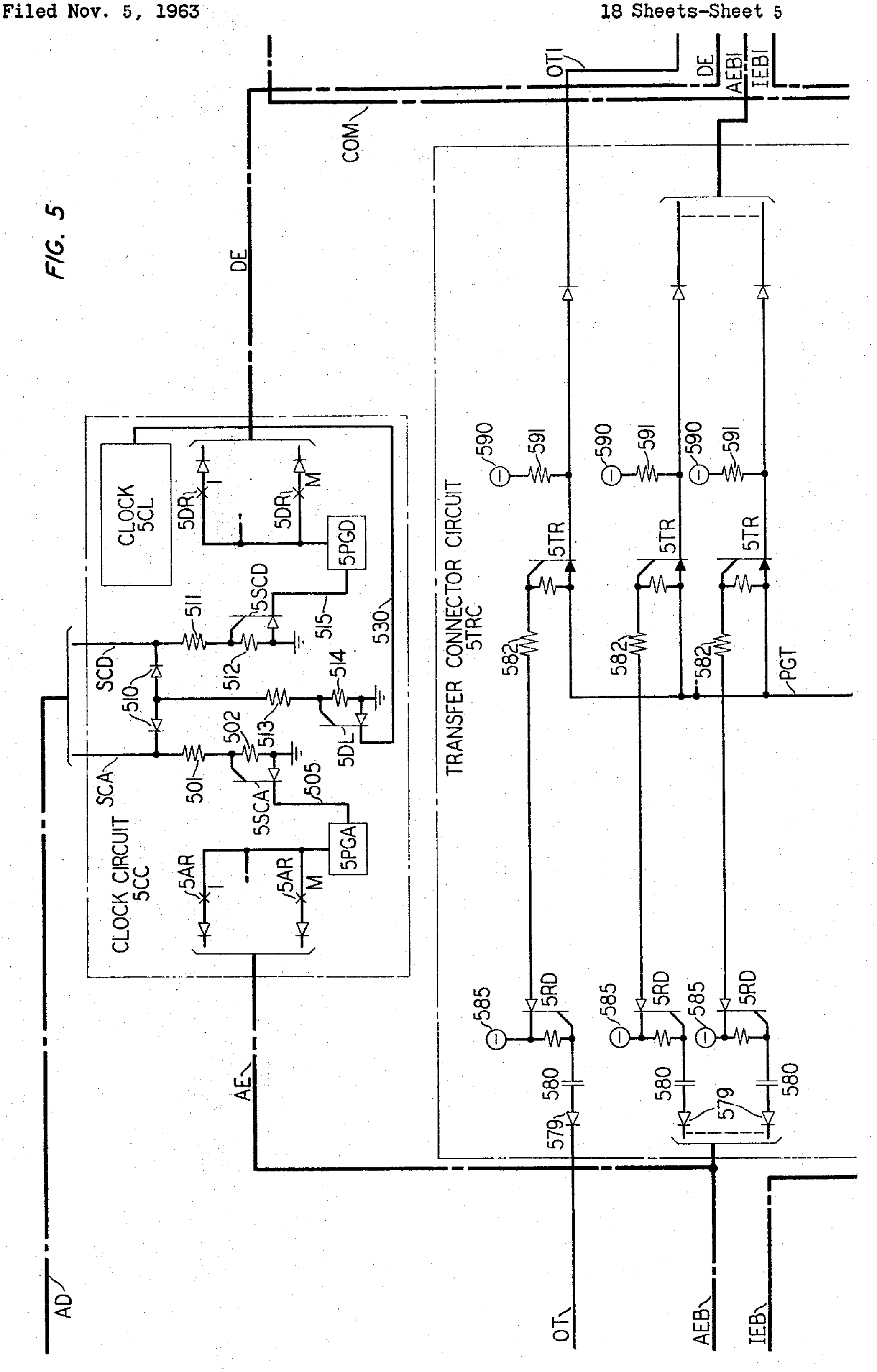
Figure 6:
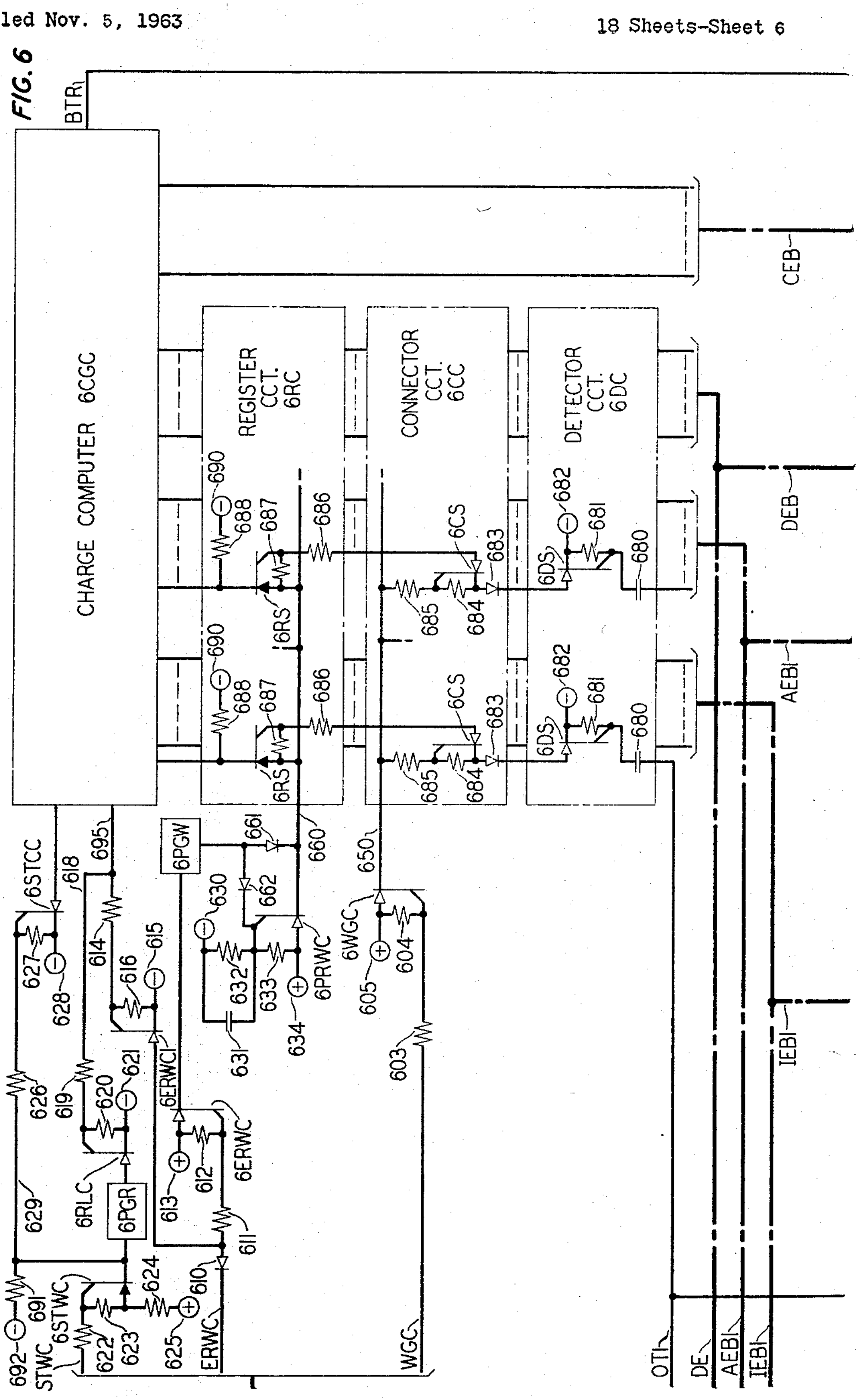
Figure 7:
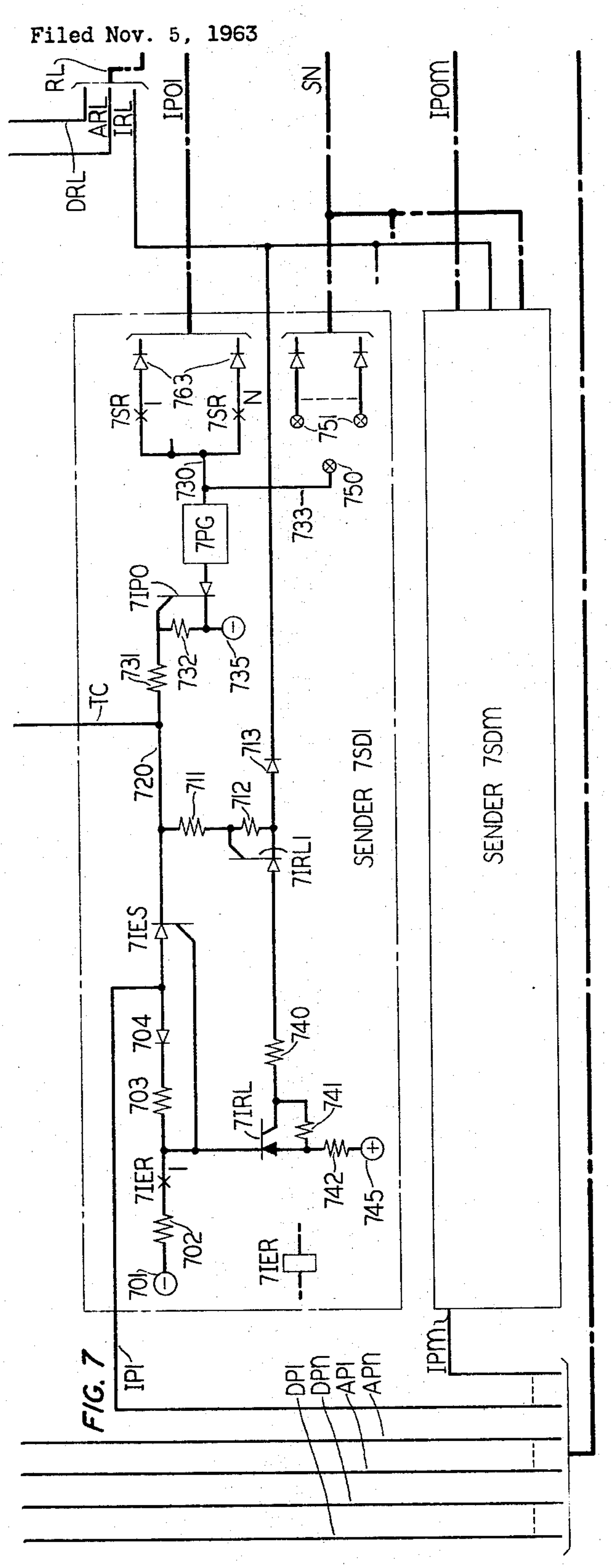
Figure 8:
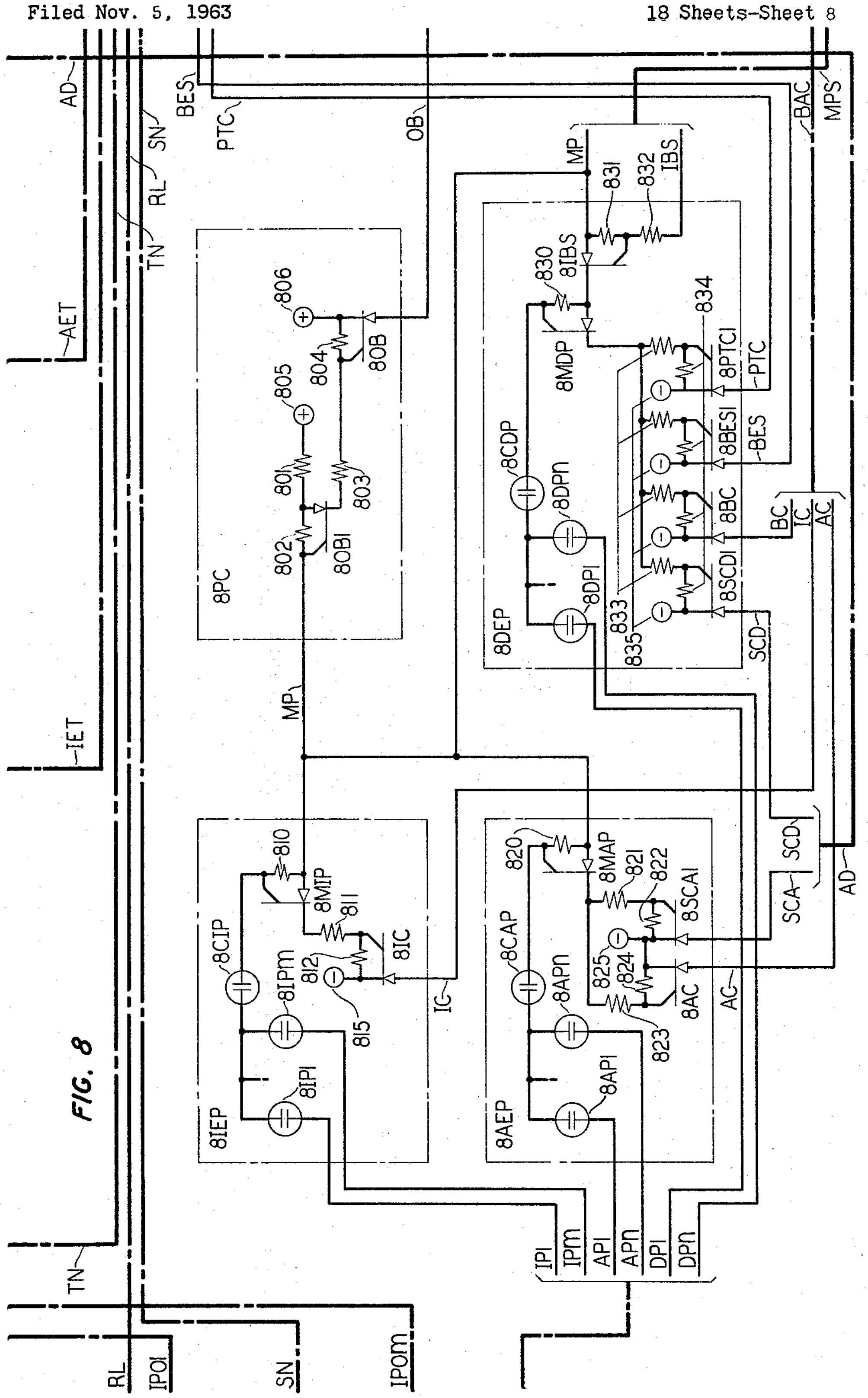
Figure 9:
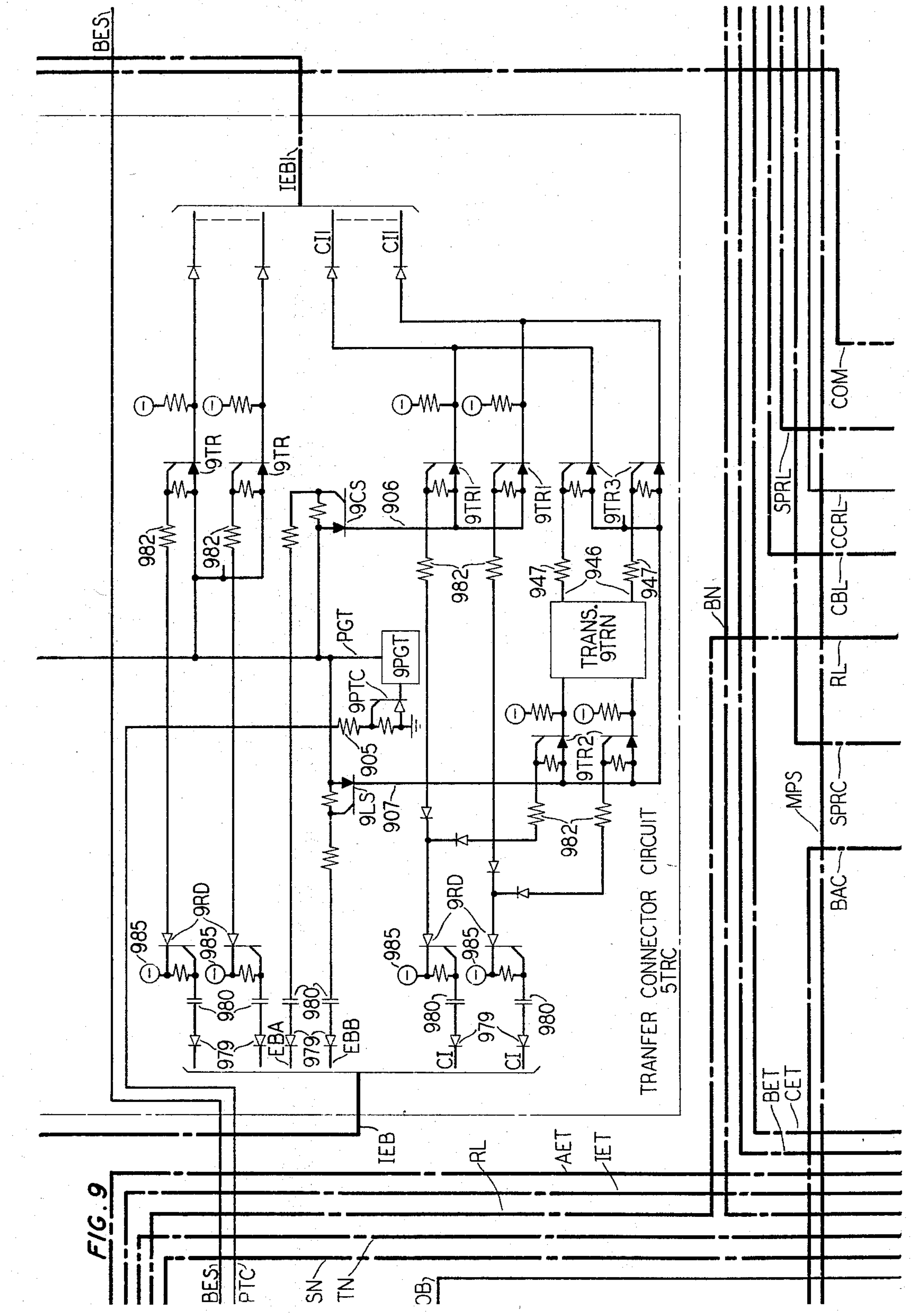
Figure 10:
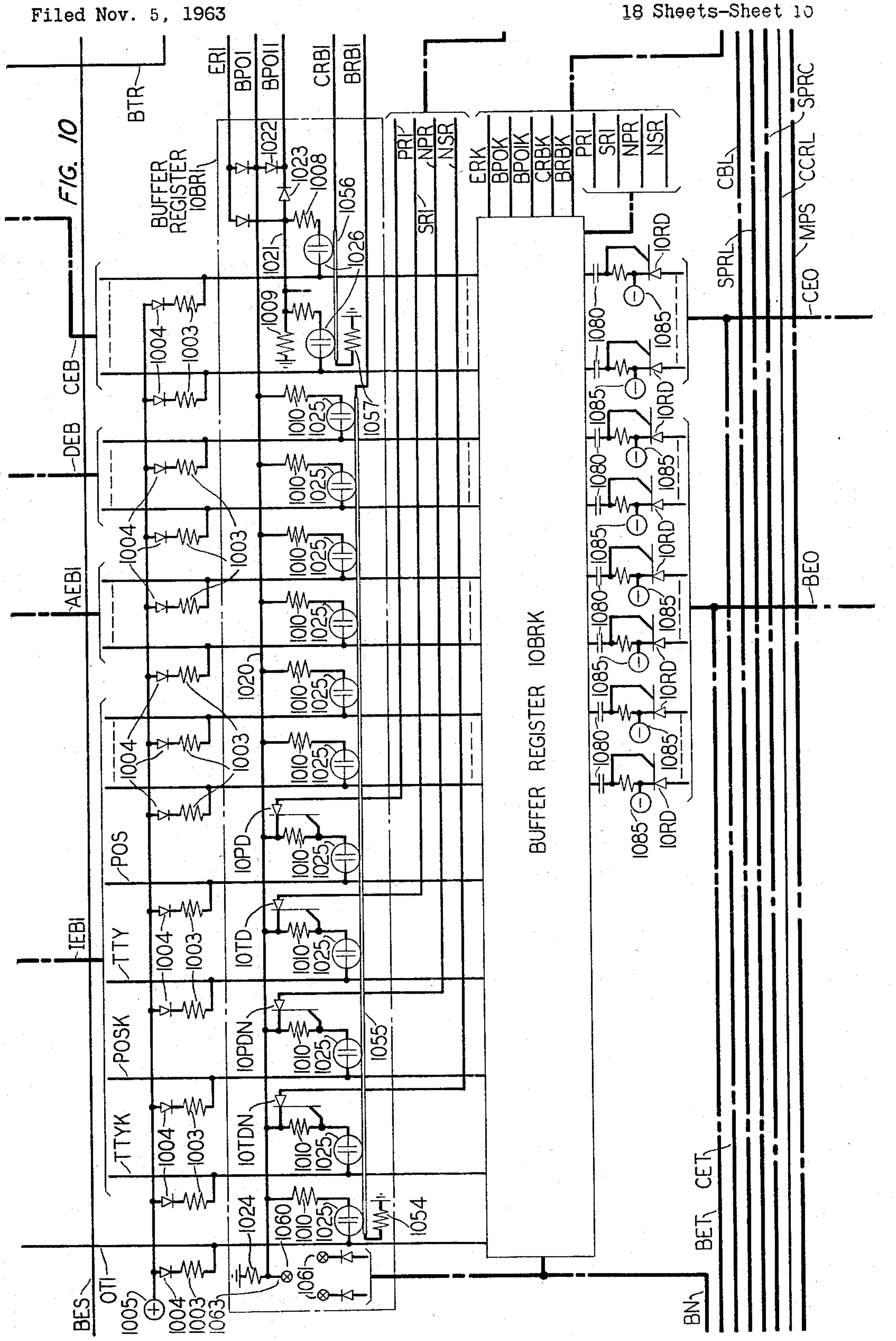
Figure 11:
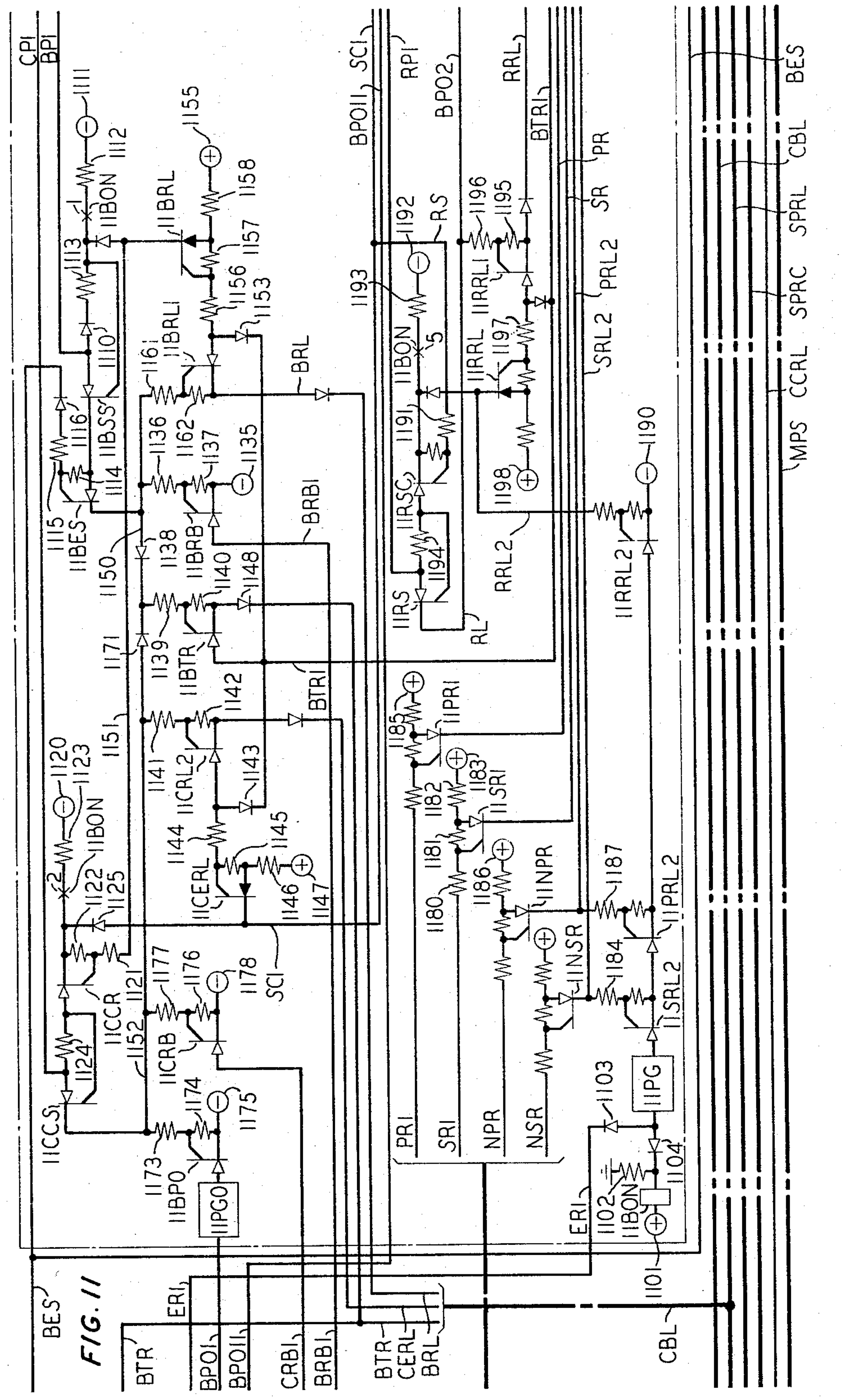
Figure 12:
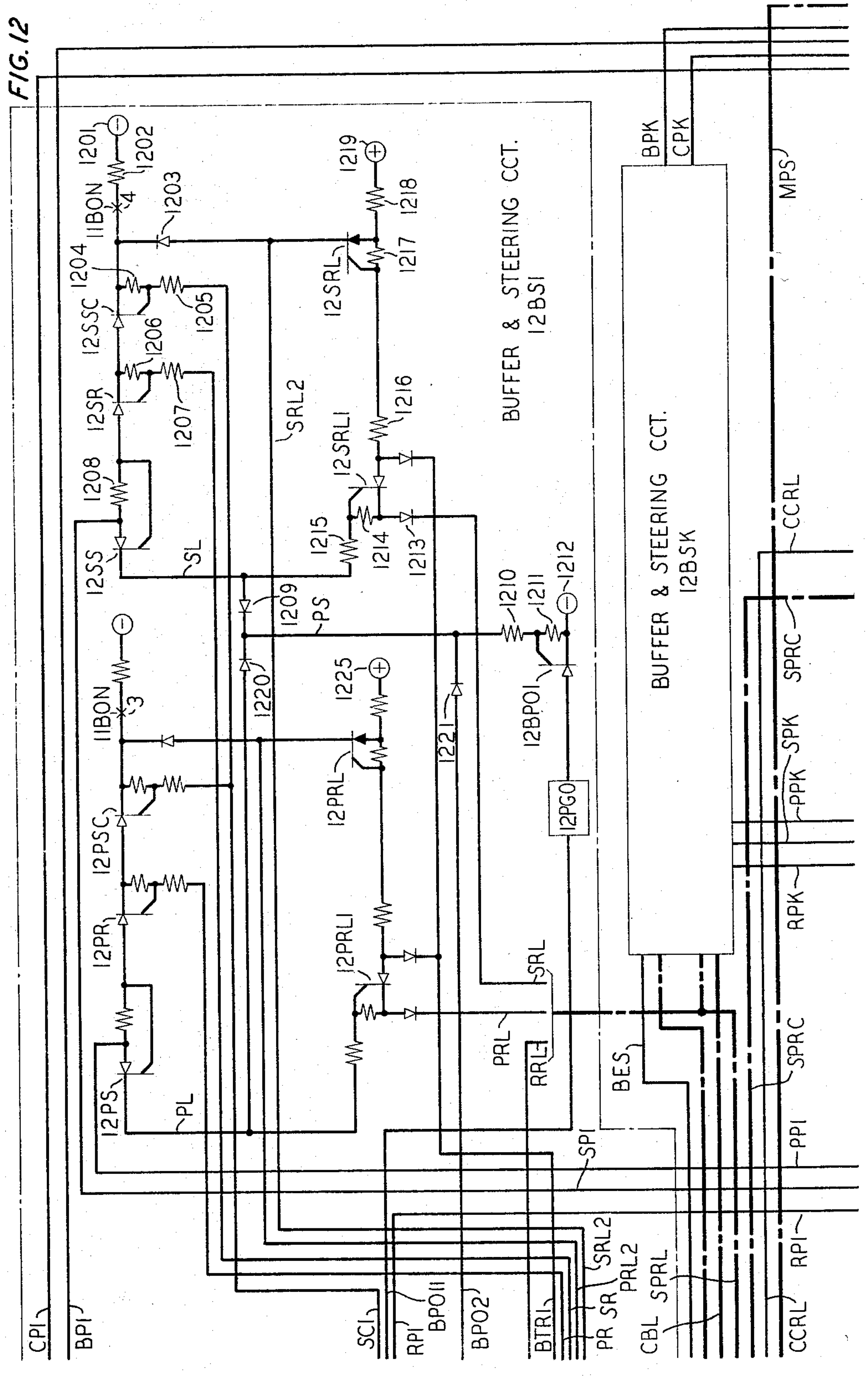
Figure 13:
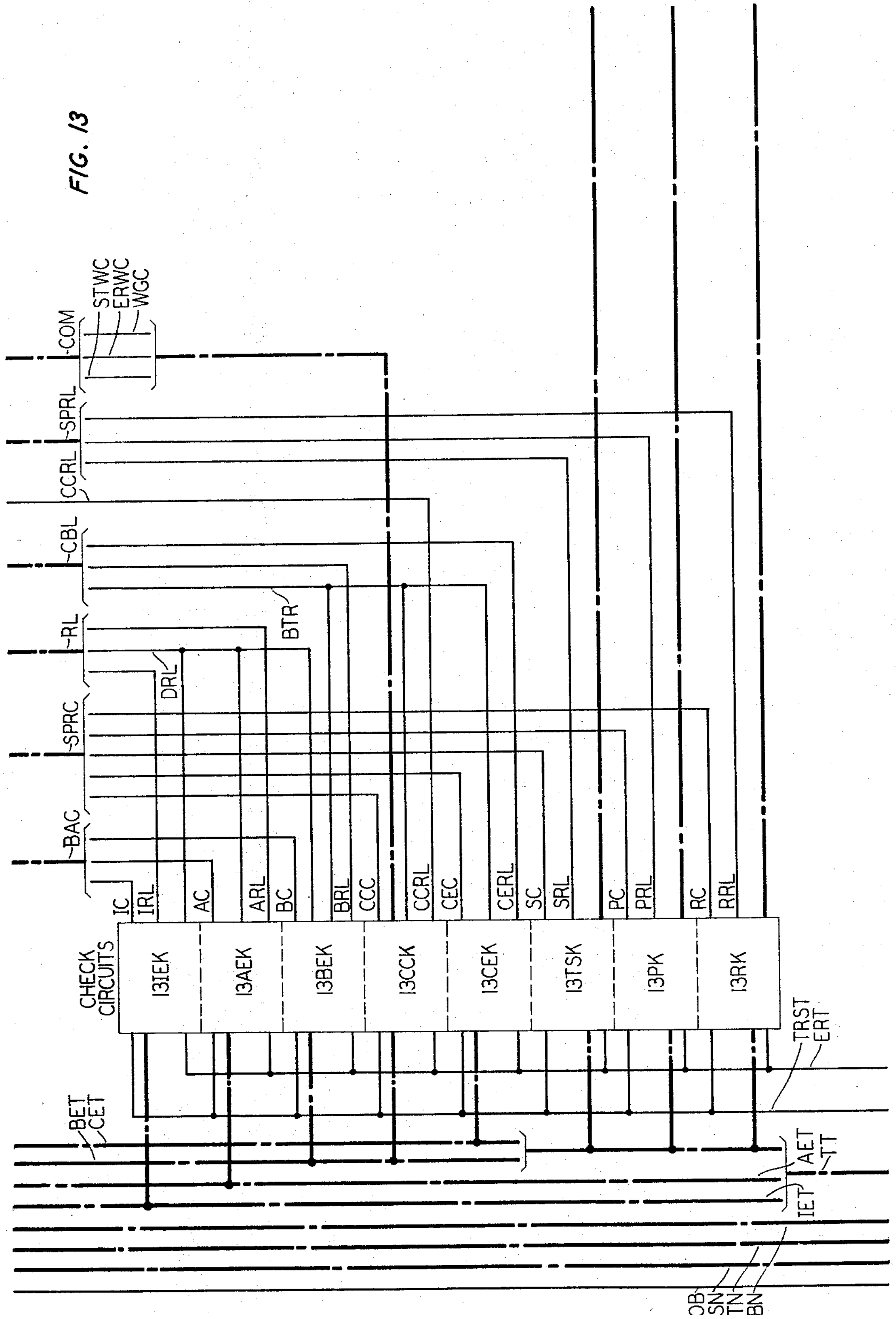
Figure 16:
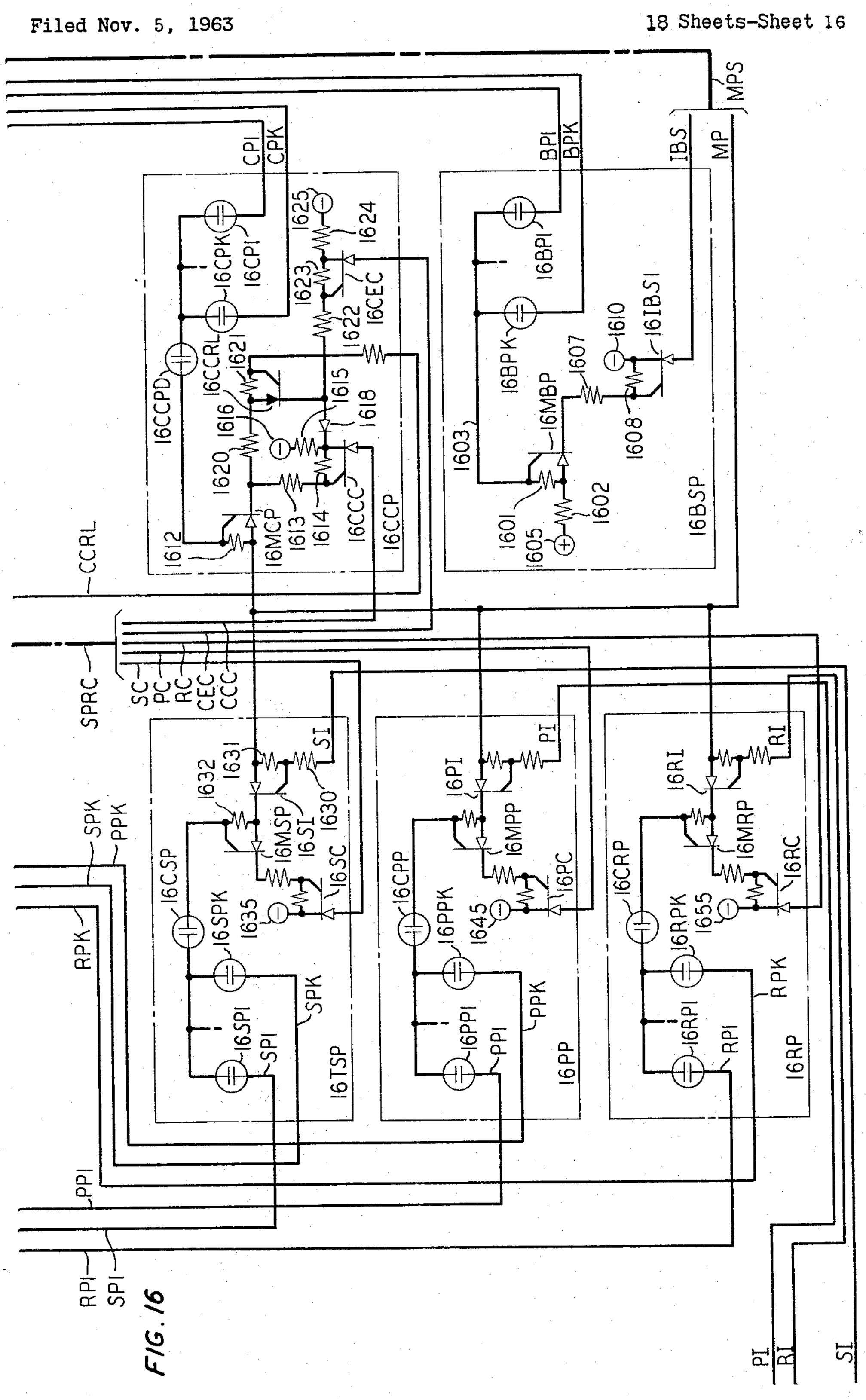
Figure 17:
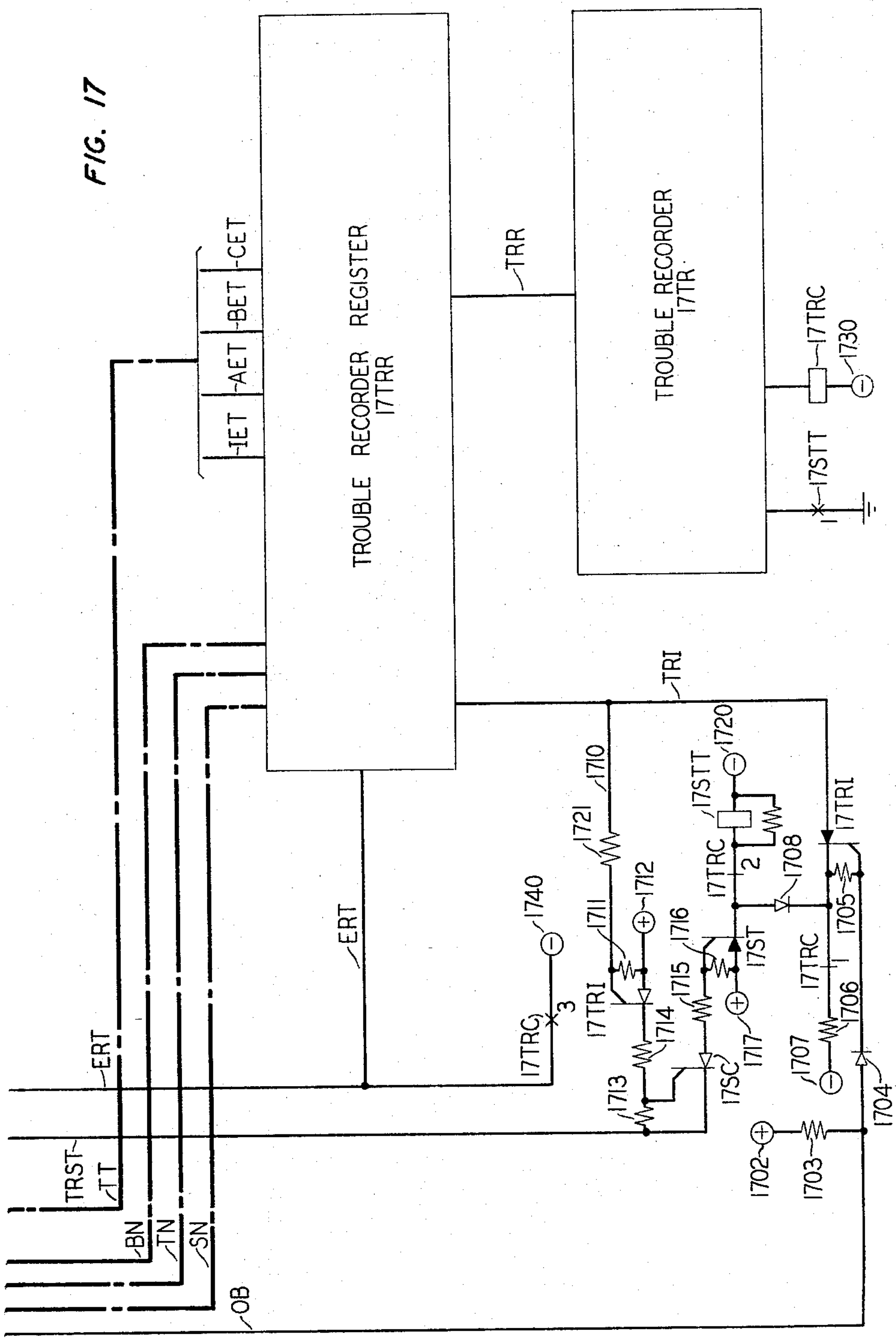
Figure 18:
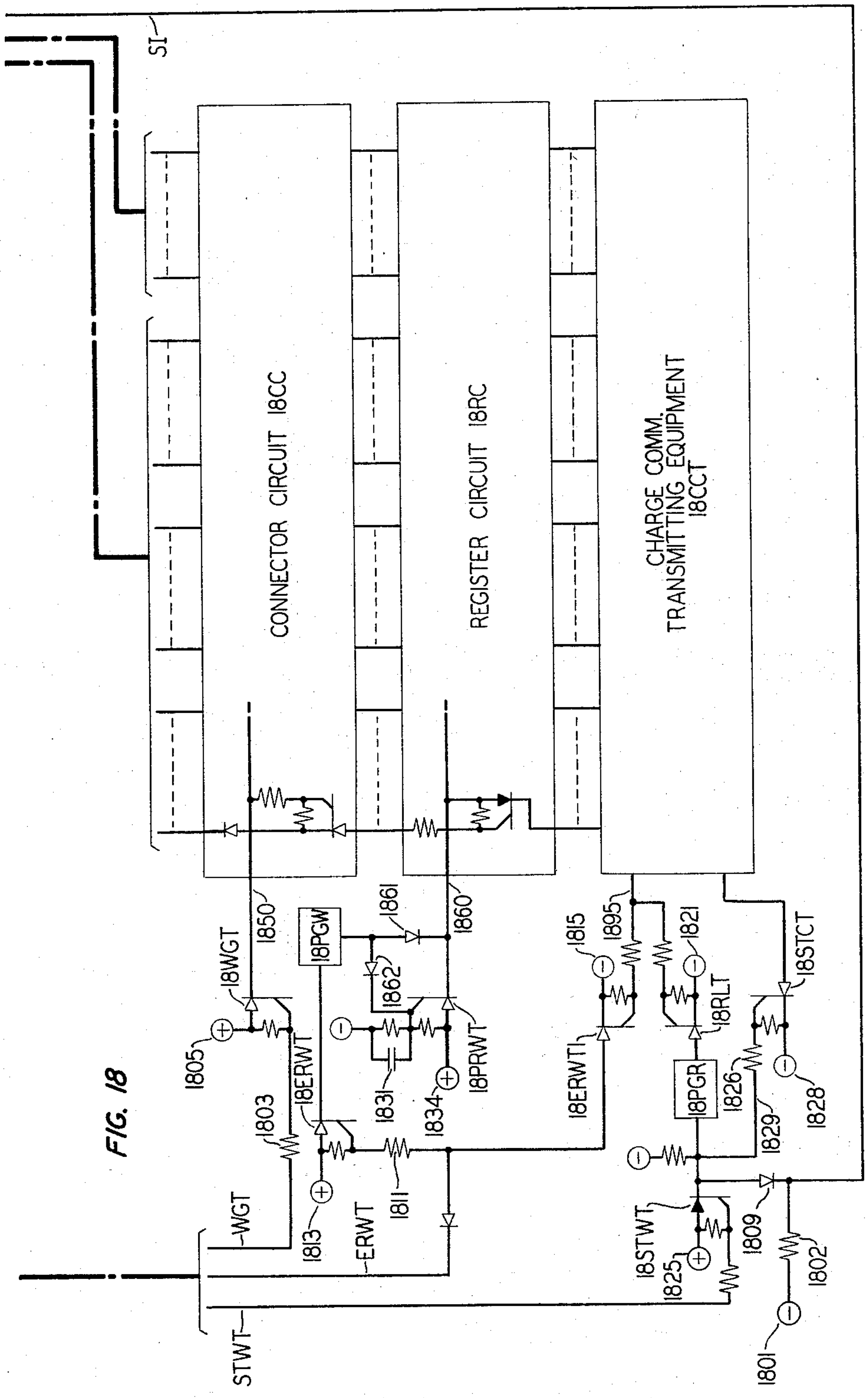

The embodiment shown in FIGS. 3 through 18 basically comprises a plurality of trunk circuits 3TC1 through 3TC*n* and associated trunk register circuits 4TR1 through 4TR*n*, a plurality of senders 7SD1 through 7SD*m*, clock circuit 5CC, transfer connector circuit 5TRC, charge computer 7CGC, a plurality of buffer registers 10BR1 through 10BR*k* and buffer and steering circuits 12BS1 through 12BS*k*, check and trouble recording circuits (FIGS. 13 and 17), recorder, position and communication output circuits (FIGS. 14, 15 and 18), and preference circuits (FIGS. 8 and 16). These circuits, with the exception of the preference circuits, are shown in the block diagram embodiment of FIGS. 1 and 2 and have been discussed generally above.

*Preference circuits*

The preference circuits shown in FIGS. 8 and 16 comprise preference controller 8PC and eight branch preference circuits—initial entry preference circuit 8IEP, answer entry preference circuit 8AEP, disconnect entry preference circuit 8DEP, buffer and steering preference circuit 16BSP, charge computer preference circuit 16CCP, recorder preference circuit 16RP, position peference circuit 16PP, and charge communication preference circuit 16TSP. All of the branch preference circuits, except buffer and steering preference circuit 16BSP, are controlled by preference controller 8PC. These circuits provide preference and lockout functions for the various information transfer operations over the common busses IEB, AEB, IEB1, AEB1, DEB and CEB.

The seven branch preference circuits controlled by preference controller 8PC each comprise a respective master preference breakdown diode and a plurality of individual preference breakdown diodes individually associated with the terminal circuits receiving preference from the particular preference circuit. One electrode of the master diode of each of these preference circuits is connected in common over lead MP to positive potential source 805 in preference controller 8PC. The structure and operation of each of these preference circuits is similar and may be understood from a consideration of initial entry preference circuit 8IEP, by way of example. In initial entry preference circuit 8IEP one electrode of each of individual preference diodes 8IP1 through 8IP*m* is connected via a respective one of leads IP1 through IP*m* to an associated one of senders 7SD1 through 7SD*m*. The other electrode of each of preference diodes 8IP1 through 8IP*m* is connected in common to one electrode of master initial entry preference diode 8CIP, the other electrode of which is connected to lead MP. When preference is desired by one of senders 7SD1 through 7SD*m* a negative potential is applied on its respective one of leads IP1 through IP*m*. This potential, combined with the potential from preference controller 8PC on lead MP, is of sufficient magnitude to break down master diode 8CIP and the individual one of preference diodes 8IP1 through **8IP*m* associated with the sender requesting preference. A conducting path is thus provided therethrough. Subsequent requests for preference by other branch preference circuits will be denied because the potential on lead MP is reduced sufficiently by the conducting path through diode 8CIP to prevent breakdown of the other master diodes connected to lead MP. Similarly, the other senders connected to initial entry preference circuit 8IEP are locked out by the conduction through the preference diode 8IP1 through 8IP*m*** associated with the sender first requesting preference.

Buffer and steering preference circuit 16BSP is similar in operation to the seven branch preference circuits, except that it is independent of preference controller 8PC. There is thus no requirement in preference circuit 16BSP for a master preference diode, but rather only for a plurality of preference diodes 16BP1 through **16BP*k* individually associated with the plurality of buffer and steering circuits 12BS1 through 12BS*k*. The common electrode connection of preference diodes 16BP1 through 16BP*k* is to source of potential 1605**. Preference request potential applied to one of leads BP1 through BP*k* from one of buffer and steering circuits 12BS1 through **12BS*k* effects the breakdown of the associated one of preference diodes 16BS1 through 16BP*k***, the resultant conduction therethrough reducing the potential applied to the common electrode connection of the other preference diodes sufficiently to prevent their being broken down by subsequent preference requests from the other buffer and steering circuits.

*Trunk registers and buffer registers*

Breakdown gas diodes, advantageously of the neon tube type, are also employed in trunk registers 4TR1 through **4TR*n* and in buffer registers 10BR1 through 10BR*k***. As is known in the prior art, if a potential difference is applied across the electrodes of a gas diode, which potential difference is insufficient to initiate breakdown of the diode, a breakdown of the diode may be initiated by concurrently applying suitable potential conditions to a conductive electrode adjacent to but outside the diode. Such potential conditions on the external electrode adjacent the gas diode create a sufficiently high potential gradient within the diode, in combination with the potential difference across the internal electrodes thereof, to initiate breakdown which provides a conductive path between the internal electrodes of the diode, which path may be maintained thereafter by a sustaining potential difference applied across the electrodes of the diode.

Each of trunk registers 4TR1 through **4TR*n* in the illustrative embodiment comprises a plurality of gas diodes 425 and 426, one electrode of each diode being connected through a respective resistor 410, lead 420, contact 3 of relay 3TON and common resistor 421 to ground. Relay 3TON, and thus contact 3 thereof, is operated when the associated trunk circuit is seized for a call. The other electrode of each diode 425 and 426 is connected to a respective one of the leads of busses IEB and AEB. The leads of busses IEB and AEB are each connected through resistors 403 and diodes 404 to source of sustaining potential 405. Each of the leads of busses IEB and AEB is also connected through a respective one of blocking capacitors 580 and 980 to a respective read detector switch 5RD or 9RD. An individual external actuator electrode 450 situated adjacent gas diodes 425 and 426 of each trunk register is connected at one end through resistor 451** to ground and is connected at the other end via one of trunk actuator leads TRB1 through TRB*n* to the respective one of trunk circuits 3TC1 through **3TC*n*** associated with the trunk register.

Information to be stored in one of trunk registers 4TR1 through **4TR*n* appears in the form of pulses on the leads of busses IEB and AEB, as will be described in detail below. Illustratively, the presence of a pulse on a lead corresponds to a bit of information of one binary character, and the absence of a pulse on the lead corresponds to a bit of information of the other binary character. The trunk register in which the information is to be registered has its actuator electrode 450 energized by a potential signal from the associated trunk circuit. The information pulses on the leads of busses IEB and AEB are of insufficient potential to break down diodes 425 and 426 in all of the trunk registers except in the one trunk register in which the actuator electrode adjacent the diodes thereof is concurrently energized. In this manner the information is selectively registered in only one of trunk registers 4TR1 through 4TR*n*. Diodes 425 and 426 that are thus broken down to conduct are maintained conducting by source of sustaining potential 405** connected to the leads of busses IEB and AEB.

Information thus stored in a trunk register is read out nondestructively on the leads of busses IEB and AEB by an interrogation pulse applied via lead 420 to each of diodes 425 and 426 in the trunk register. The interrogation pulse is provided by the associated trunk circuit over the respective one of pulsing lead TPO1 through TPO*n* to lead 420, and it is passed through only those diodes 425 and 426 of the trunk register which have been previously broken down to provide a conductive path. The pulse is thus reflected through the conducting diodes to corresponding leads of busses IEB and AEB and thence through capacitors 580 and 980 to read detector switches 5RD and 9RD, respectively connected thereto. Read detector switches 5RD and 9RD to which the interrogation pulse is applied are switched to a conducting state. In this manner the information stored in any one of trunk registers 4TR1 through **4TR*n* is selectively registered on read detector switches 5RD and 9RD. Capacitors 580 and 980 permit passage of interrogation pulses on the leads of busses IEB and AEB to operate switches 5RD and 9RD**, and they prevent false operation of these switches from direct current.

Information stored in a trunk register is erased, such as upon termination of a call connection over the associated trunk circuit, by interruption of the sustaining potential for the diodes in the trunk register. The path for the sustaining potential, it will be recalled, extends from source 405 through diodes 404, resistors 403, busses IEB and AEB, gas diodes 425 and 426, resistors 410, operated contact 3 of relay 3TON, and resistor 421 to ground. When the call connection over the associated trunk circuit is terminated, relay 3TON therein is released, releasing contact 3 in the trunk register to interrupt the sustaining path. All of gas diodes 425 and 426 in the particular trunk register are thus placed in a nonconducting state ready to register information pertaining to a subsequent call.

Buffer registers 10BR1 through **10BR*k* are similar to trunk registers 4TR1 through 4TR*n*, except that the gas diodes therein are divided into two groups. One group of gas diodes, diodes 1025, are connected to the leads of busses IEB1, AEB1 and DEB; and the other group, diodes 1026, are connected to the leads of charge entry bus CEB. Separate actuator electrodes 1055 and 1056 are provided for diodes 1025 and 1026, respectively, for the storage of information therein. Source of sustaining potential 1005 is connected to one electrode of each of diodes 1025 and 1026, the other electrode of which is connected to ground. Information is nondestructively read out of diodes 1025** by interrogation pulses or respective ones of leads BPO1 through BPO*k*, and is nondestructively read out of diodes 1026 by interrogation pulses on leads BPO11 through BPO1*k*. Erasure of the information stored in a buffer register is effected by an erase signal on the respective one of leads ER1 through ER*k*, which erase signal reduces the potential across the electrodes of diodes 1025 and 1026 to a value below the sustaining potential thereof.

Figure 19:
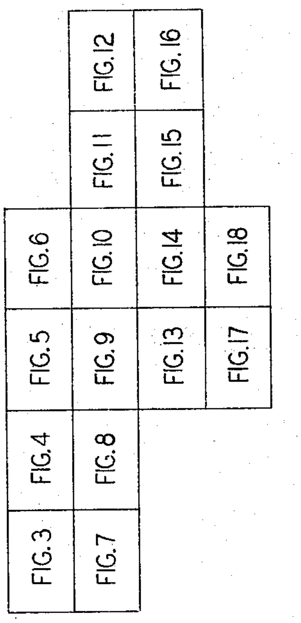

A detailed description of the operation of the illustrative embodiment of the present invention shown in FIGS. 3 through 18, arranged in accordance with FIG. 19, will now be considered. Assume that a toll call has placed from a hotel or similar establishment for which a charge determination is to be made and communicated to the hotel immediately upon termination of the call. In the manner set forth in the above-identified Busch patent, the common control equipment at the switching office to which the calling line is connected seizes an appropriate idle sender and outgoing trunk circuit, for example sender 7SD1 and trunk circuit 3TC1. Sender link circuit 3SLK operates to interconnect sender 7SD1 and trunk circuit 3TC1. Relay 3TON is operated upon seizure of trunk circuit 3TC1, closing contacts 1, 2, and 3 thereof. Assume further that the initial call information designating the calling and called subscribers and the class of service of the call has been transferred to sender 7SD1 and registered on the digit register relays 7SR thereof (not shown in FIG. 7), operating certain of digit register contacts 1 through N in accordance therewith. Each of contacts 1 through N corresponds to a bit of information, of one binary character if the contact is operated and of the other binary character if the contact is unoperated. Sender 7SD1 then proceeds in the manner set forth in the Busch patent to pulse this information to the terminating office via sender link 3SLK and trunk circuit 3TC1. The common control equipment and the sender and trunk circuit apparatus for performing these functions are shown and described in the Busch patent and forms no part of the present invention.

*Initial entry in trunk register*

Upon registration of the initial items of information on contacts 1 through N of digit register relays 7SR, initial entry request relay 7IER is energized to initiate transfer of this information over initial entry bus IEB to trunk register 4TR1. This transfer advantageously occurs concurrently with the pulsing by sender 7SD1 of the information over trunk circuit 3TC1 to the terminating office. As mentioned above, sender 7SD1 is connected via lead IP1 to an individual preference diode 8IP1 in initial entry preference circuit 8IEP. When relay 7IER in sender 7SD1 is energized, a path is completed to extend negative potential from source 701 through resistor 702, operated contact 1 of relay 7IER, resistor 703 and diode 704, over lead IP1 to preference diode 8IP1. Positive potential is applied by source 805 from preference controller 8PC over lead MP to master initial entry preference diode 8CIP. Assuming that no other senders connected to preference circuit 8IEP have received preference and further that no other branch preference circuits connected to preference controller 8PC have received preference (that is, none of individual preference diodes 8IP1 through 8IP$m$ and none of master preference diodes 8CAP, 8CDP, 16CSP, 16CRP, 16CPP and 16CCPD are conducting), the potential difference across diodes 8IP1 and 8CIP is sufficient to break down these diodes to provide a conducting path therethrough between leads MP and IP1. The consequent reduction in potential on lead MP, due to resistor 801, locks out the other branch preference circuits connected to lead MP and, also, locks out the other senders connected to initial entry preference circuit 8IEP. Diodes 8IP1 and 8CIP continue to conduct until the potential thereacross is removed or reduced below the sustaining potential of the diodes.

The current flow in lead IP1 upon breakdown of diode 8IP1, indicating preference to sender 7SD1, produces a potential difference across resistor 703 to switch initial entry switch 7IES to a conducting state. The signal on lead IP1 is thus extended through switch 7IES over lead 720 and lead TC to trunk circuit 3TC1, directing trunk circuit 3TC1 to enable associated trunk register 4TR1 for receiving initial entry information pertaining to the call over trunk circuit 3TC1. The signal on lead TC is applied through resistor 336 to one end of resistor 337, the other end of which is connected to source of potential 335. The potential difference across resistor 337 switches trunk register switch 3TBR to a conducting state, thereby completing a path from source 335 over lead TRB1 to actuator electrode 450 situated adjacent gas diodes 425 in trunk register 4TR1 and through resistor 451 to ground potential.

The potential signal on lead 720 is also applied through resistor 731 to one end of resistor 732, the other end of which is connected to source of potential 735. Initial entry pulsing switch 7IPO switches to a conducting state switches trunk register switch 3TRB to a conducting to connect source 735 to pulse generator 7PG. Responsive thereto, pulse generator 7PG applies a positive potential over lead 730 to each of digit register contacts 1 through N of digit register relays 7SR. These contacts are individually operated in accordance with the information registered thereon from the marker. The pulse from pulse generator 7PG on lead 730 is thus extended through the operated contacts of digit register relays 7SR through diodes 763 over corresponding leads of bus IPO1 to the leads of initial entry bus IEB. Each of the leads of initial entry bus IEB is connected to one electrode of a respective one of diodes 425, the other electrode of which is connected through a resistor 410, over lead 420, operated contact 3 of relay 3TON and resistor 421 to ground. Accordingly, when switch 7IPO is operated in the manner described above, the information registered on digit register relays 7SR of sender 7SD1 is reflected on the corresponding leads of bus IEB in the form of positive potential pulses representing bits of one binary character. Coincidence of a pulse on a lead of bus IEB and the potential from source 335 on actuator electrode 450 is sufficient to break down diode 425 connected to that lead and situated adjacent electrode 450. The pulse is not, however, sufficient to break down any diode 425 connected to the bus lead which is not situated adjacent the energized actuator electrode; that is, diodes 425 in the other trunk registers. In this manner the initial entry information provided by sender 7SD1 on the leads of initial entry bus IEB is selectively registered in trunk register 4TR1, and it is maintained registered therein by source of sustaining potential 405 connected through diodes 404 and resistors 403 to each of the leads of bus IEB.

The pulse provided by pulse generator 7PG on lead 730 is also applied over lead 733 to terminal 750. Terminal 750 is connected to one or more of terminals 751, and thus to corresponding leads of sender identification bus SN, in an arbitrary pattern particularly identifying sender 7SD1. The pulse on lead 733 is thus extended via the connections between terminals 750 and 751 over a particular combination of the leads of bus SN to trouble recorder register 17TRR. If a trouble record is required for the call, as described hereinbelow, the identity of the sender serving the call is thus included in the record.

Breakdown of master preference diode 8CIP upon seizure of the system by initial entry preference circuit 8IEP is detected by initial entry preference switch 8MIP to provide a control signal on lead IC to initial entry check circuit 13IEK. Resistor 810 is connected in circuit with diode 8CIP. The potential difference across resistor 810, upon breakdown and conduction of diode 8CIP, switches initial entry preference switch 8MIP to a conducting state. This completes a conducting path to extend the potential on lead MP through switch 8MIP and through resistors 811 and 812 to source of potential 815. The potential difference across resistor 812 is detected by switch 8IC, which switches to a conducting state to connect source of potential 815 therethrough over lead IC to check circuit 13IEK. The leads of initial entry bus IEB are connected via check bus IET to check circuit 13IEK, and thus the initial entry information transferred from sender 7SD1 to trunk register 4TR1 is also applied to check circuit 13IEK. Responsive to the control signal on lead IC, check circuit 13IEK checks the correctness of the initial entry information and, if the check is satisfactory, provides a negative potential signal on lead IRL over cable RL through diode 713 to the cathode electrode of switch 7IRL1 in sender 7SD1. The positive potential extended from source 805 over lead IP1 to lead 720 is applied through resistor 711 to the gate electrode switch 7IRL1 and on through resistor 712 to lead IRL.

Switch 7IRL1 is thus caused to conduct, completing a path from lead IRL through switch 7IRL1, resistors 740, 741 and 742 to source of potential 745. The resulting potential drop across resistor 741 switches initial entry release switch 7IRL to a conducting state to initiate release of sender 7SD1 from the charge determination system. The normal operation of the telephone switching control circuitry in accordance with the above-identified Busch patent is such that sender 7SD1 is released upon completion of outpulsing of the information to the terminating office. However this operation is considerably slower than the operation of the present charge determination system in registering the initial entry information in a trunk register. For example, in an illustrative embodiment, the pulse provided by pulse generator 7PG to effect registration of the information in trunk register 4TR1 may be on the order of fifty microseconds. Accordingly, immediately upon registration of the information in trunk register 4TR1 and provision of a satisfactory check signal on lead IRL, release switch 7IRL operates in the manner described above to release sender 7SD1 and trunk register 4TR1 from initial entry bus IEB, thereby making bus IEB available for use on other calls.

Operation of switch 7IRL completes a path shunting switch 7IES, which may be traced from the gate electrode of switch 7IES through switch 7IRL and resistor 742 to source 745. Switch 7IES ceases to conduct, removing potential from lead 720 and thus form lead TC to trunk circuit 3TC1. Consequently, switches 7IPO, 7IRL1 and 3TRB are released. Release of switch 3TRB removes the potential from actuator electrode 450 in trunk register 4TR1. The information registered in trunk register 4TR1 is maintained therein by source of sustaining potential 405, as described above. Release of switch 7IRL1 breaks the connection of sender 7SD1 to lead IRL; however, release switch 7IRL is maintained operated by the conducting path therethrough, which may be traced from source 701 through resistor 702, operated contact 1 of relay 7IER, switch 7IRL and resistor 742 to source 745. When relay 7IER is subsequently de-energized, upon release of sender 7SD1 by the common control telephone equipment, contact 1 thereof releases to interrupt the above-traced path, thereby releasing switch 7IRL.

The shunting path completed when switch 7IRL is initially energized also functions to decrease the potential on lead IP1 to a level insufficient to maintain diodes 8IP1 and 8CIP in a conducting state. These diodes cease to conduct, interrupting the current flow through resistor 810 to return switch 8MIP, and thus switch 8IC, to a nonconducting state, thereby removing the potential signal of source 815 from lead IC. Responsive to the removal of source 815 from lead IC, check circuit 13IEK terminates the negative potential applied to lead IRL.

*Answer entry in trunk register*

Sender 7SD1 pulses the call information to the terminating office over trunk circuit 3TC1, it will be recalled, and if the called line is idle it is seized by the terminating office equipment for the call. When the called subscriber answers the call, answer entry request relay 3AER in trunk circuit 3TC1 is energized to initiate registration of the answer entry in trunk register 4TR1. Trunk circuit 3TC1 is connected via lead AP1 to an individual preference diode 8AP1 in answer entry preference circuit 8AEP. When relay 3AER is energized, a path is completed to extend negative potential from source 301 through resistor 302, operated contact 1 of relay 3AER, resistor 303 and diode 304, over lead AP1 to preference diode 8AP1. Positive potential is applied by source 805 from preference controller 8PC over lead MP to master answer entry preference diode 8CAP. Assuming that no other trunk circuits or branch preference circuits have received preference, the potential across diodes 8AP1 and 8CAP is sufficient to break down these diodes to a conducting state, locking out the other trunk circuits and preference circuits in the manner described above.

The potential difference across resistor 303 switches answer entry switch 3AES to a conducting state, extending the potential signal on lead AP1 therethrough, through diode 333 and resistors 336 and 337 to negative potential source 335. Trunk register switch 3TRB is operated by the potential difference across resistor 337 to complete a conducting path from source 335 over lead TRB1 to actuator electrode 450 in trunk register 4TR1 and through resistor 451 to ground. Diodes 426 situated adjacent electrode 450 in trunk register 4TR1 are thus prepared for the registration of answer entry information to be provided on answer entry bus AEB from clock circuit 5CC.

Clock circuit 5CC comprises a clock 5CL for providing a continuous indication of the date and time of day on contacts 1 through M of both of digit registers 5AR and 5DR. This indication is manifested in binary form in accordance with the operated or unoperated state of the respective contacts of digit registers 5AR and 5DR. A signal on lead SCA through resistors 501 and 502 to ground switches answer clock switch 5SCA to a conducting state, extending ground over lead 505 to pulse generator 5PGA. Responsive thereto, pulse generator 5PGA applies a positive potential pulse through the operated ones of contacts 1 through M of digit register 5AR over corresponding leads of bus AE to the respective leads of answer entry bus AEB. Similarly, a signal on lead SCD through resistors 511 and 512 switches disconnect clock switch 5SCD to a conducting state to extend ground over lead 515 to pulse generator 5PGD, which applies a pulse through the operated ones of contacts 1 through M of digit register 5DR over corresponding leads of bus DE to the respective leads of disconnect entry bus DEB. In this manner the time and date indication is selectively directed over bus AE to answer entry bus AEB or over bus DE to disconnect entry bus DEB in accordance with respective signals on leads SCA and SCD.

To preclude errors due to clock 5CL advancing the time and date indication on digit registers 5AR and 5DR during the time when this nformation is being read out on busses AE and DE, clock delay switch 5DL is provided. Each signal on lead SCA or lead SCD is extended through one of diodes 510 and through resistors 513 and 514 to ground, switching delay switch 5DL to a conducting state. Switch 5DL connects ground over lead 530 to clock 5CL, preventing clock 5CL from advancing for a period sufficient to insure that readout has been completed.

A signal is provided on lead SCA by answer entry preference circuit 8AEP upon its being granted preference by preference controlled 8PC. The potential difference across resistor 820, due to the conduction through diodes 8AP1 and 8CAP, switches answer entry preference switch 2MAP to a conducting state. This completes a path from lead MP through resistors 821 and 822 to source 825, switching switch 8SCA1 to a conducting state, and a path through resistors 823 and 824 to source 825, switching switch 8AC to a conducting state. Source of potential 825 is connected through operated switch 8SCA1 over lead SCA to clock circuit 5CC. The time and date the called subscriber answered the call is thus provided by clock circuit 5CC, as described above, over bus AE to the leads of answer entry bus AEB. This answer information is selectively registered on diodes 426 in trunk register 4TR1, and in no other trunk register since only trunk register 4TR1 has its actuator electrode 450 energized.

The conduction of switch 8AC extends source of potential 825 over lead AC to answer entry check circuit 13AEK. The leads of answer entry bus AEB are connected via check bus AET to check circuit 13AEK, and thus the answer entry information provided by clock circuit 5CC on bus AEB is also applied to check circuit 13AEK. Assuming a check of the information is found satisfactory, check circuit 13AEK returns a negative potential signal on lead ARL over cable RL through diode 313 to the cathode electrode of switch 3ARL1 in trunk circuit 3TC1. The positive potential from source 805 over lead AP1 through operated switch 3AES is applied through resistor 311 to the gate electrode of switch 3ARL1 and on through resistor 312 to lead ARL. Switch 3ARL1 is switched to a conducting state to connect lead ARL through resistors 340, 341 and 342 to source 345. Answer entry release switch 3ARL is switched to a conducting state by the potential difference across resistor 341, and locks up through the conducting path completed from source 345 through resistor 342, switch 3ARL, operated contact 1 of relay 3TON and resistor 305 to source 301. An alternate locking path for switch 3ARL may be traced from the cathode electrode thereof through diode 306, operated contact 1 of relay 3AER and resistor 302 to source 301.

Operation of switch 3ARL shunts switch 3AES which ceases to conduct, thereby releasing switches 3ARL1 and 3TRB. Release of switch 3TRB removes the potential from actuator electrode 450 in trunk register 4TR1. Release of switch 3ARL1 breaks the connection of trunk circuit 3TC1 to lead ARL. Answer entry request relay 3AER is subsequently de-energized, but release switch 3ARL is maintained in a conducting state via the path above-traced through operated contact 1 of relay 3TON. Relay 3TON remains energized until trunk circuit 3TC1 is released by the common control equipment upon termination of the call connection over trunk circuit 3TC1.

The shunting path completed by switch 3ARL further functions to decrease the potential on lead AP1 to a level insufficient to maintain diodes 8API and 8CAP conducting. When diodes 8API and 8CAP cease to conduct, switches 8MAP, 8AC and 8SCA1 are returned to a nonconducting state, removing potential source 825 from leads AC and SCA. Responsive to the removal of potential from lead SCA, switch 5SCA releases in clock circuit 5CC. Check circuit 13AEK responds to the removal of potential from lead AC to terminate the negative potential signal applied to lead ARL. Accordingly, the system is released for use on other calls.

The items of information pertaining to the call over trunk circuit 3TC1 thus registered in trunk register 4TR1 on diodes 425 specifies the designation of the calling and called subscribers and the class of service of the call, and the information registered on diodes 426 specifies the time and date of completion of the call connection. This initial and answer information remains registered in trunk register 4TR1 for the duration of the call over associated trunk circuit 3TC1. The sustaining path for maintaining each of diodes 425 and 426 in a conducting state may be traced from source 405 through diode 404, resistor 403, the respective diode 425 or 426, resistor 410, operated contact 3 of relay 3TON and resistor 421 to ground.

*Information transfer to buffer register*

When one of the parties to the call releases or terminates the call connection, disconnect entry request relay 3DER is energized, contact 1 thereof operating to extend negative source of potential 321 through resistors 322 and 323 and diode 324 over lead DP1 to individual preference diode 8DP1 in disconnect entry preference circuit 8DEP. Positive potential from source 805 in preference controller 8PC is available on lead MP to preference circuit 8DEP, but it is not applied to master disconnect entry preference diode 8CDP unless switch 8IBS is in a conducting state to provide a path therethrough. Switch 8IBS is switched to a conducting state by negative potential on lead IBS from buffer and steering preference circuit 16BSP, which potential is provided on lead IBS when an idle one of buffer and steering circuits 12BS1 through **12BS*k* and its associated one of buffer registers 10BR1 through 10BR*k* is available for registration of the information to be transferred thereto from trunk register 4TR1**.

Each of buffer and steering circuits 12BS1 through **12BS*k* includes an individual off-normal relay 11BON which is in an energized condition when the buffer and steering circuit is idle. The path for energizing relay 11BON in buffer and steering circuit 12BS1, for example, may be traced from source 1101 through the winding of relay 11BON and resistor 1102 to ground. Energization of relay 11BON extends source of potential 1111 through resistor 1112, operated contact 1 of relay 11BON, resistor 1113, diode 1110, over lead BP1 to one electrode of individual buffer preference diode 16BP1. The other electrode of each of diodes 16BP1 through 16B*k* is connected through lead 1603 and resistors 1601 and 1602 to source of potential 1605. It may be appreciated that normally more than one of buffer and steering circuits 12BS1 through 12BS*k* will be idle at any given time, and thus their respective off-normal relays 11BON** will be energized to extend negative potential over the corresponding ones of leads PB1 through PB*k* to individual preference diodes 16BP1 through **16BP*k*. However, due to the dynamic negative resistance characteristics of gas diodes 16BP1 through 16BP*k*, only a single preference diode will be broken down to grant preference to the corresponding one of buffer and steering circuits 12BS1 through 12BS*k*** connected thereto.

Assume, for the purposes of illustration, that preference has been granted to buffer and steering circuit 12BS1; that is, that preference diode 16BP1 has been broken down to provide a conducting path therethrough. The common electrode potential on lead 1603 is reduced sufficiently by the conduction through diode 16PB1 to prevent breakdown of the other buffer and steering preference diodes. The potential drop across resistor 1601 switches buffer preference switch 16MBP to a conducting state, completing a connection from source 1605 through resistor 1602, switch 16MBP, resistors 1607 and 1608 to source 1610. Switch 16IBS1, connected across resistor 1608, conducts to connect source 1610 over lead IBS to disconnect entry preference circuit 8DEP, thereby indicating that an idle one of buffer and steering circuits 12BS1 through **12BS*k*** is avialable for registration of information.

The potential on lead IBS from buffer and steering preference circuit 16BSP is directed through resistors 832 and 831 to lead MP. The potential difference across resistor 831 switches switch 8IBS to a conducting state to connect lead MP through resistor 830 to master disconnect entry preference diode 8CDP. It will be recalled that negative potential is extended from trunk circuit 3TC1 over lead DP1 to preference diode 8DP1 upon operation of disconnect entry request relay 3DER. Assuming no other trunk circuits have been granted disconnect entry preference, and further that no other branch preference circuits have been granted preference by preference controller 8PC, diodes 8DP1 and 8CDP are broken down to a conducting state. This condition is detected by resistor 830 to switch disconnect preference switch 8MPD to a conducting state, completing a path to connect lead MP through each of resistors 833 and 834 to respective sources of potential 835. Accordingly, each of switches 8SCD1, 8BC, 8BES1 and 8PTC1 is switched to a conducting state.

Breakdown and conduction of preference diodes 8DP1 and 8CDP also produce a potential difference across resistor 323 in trunk circuit 3TC1 which is detected by switch 3DES. Switch 3DES operates to provide a conducting path from lead DP1, and thus source 805, over lead 330 through resistors 371 and 372 to source of potential 375. Switch 3TPO is caused to conduct by the potential difference across resistor 372 and operates to connect source 375 to pulse generator 3PGO. Responsive thereto, pulse generator 3PGO applies a negative interrogation pulse over lead TPO1 to lead 420 to effect nondestructive readout of the information registered in gas diodes 425 and 426 in trunk register 4TR1. The interrogation pulse on lead 420 passes through the individual ones of diodes 425 and 426 which are conducting and thus to the corresponding leads of initial entry bus IEB and answer entry bus AEB. The pulse on lead 420 does not pass through diodes 425 and 426 which are not broken down and it is insufficient to effect the breakdown of these diodes. In this manner the initial and answer entry information registered in trunk register 4TR1 is reflected over busses IEB and AEB to transfer connector circuit 5TRC.

Trunk circuit 3TC1 includes a timed disconnect relay 3TOT which is utilized for timed disconnect operation of trunk circuit 3TC1. This occurs when the called subscriber, rather than the calling subscriber, terminates the call connection. Thus, when the called subscriber goes on hook before the calling subscriber, the operation of trunk circuit 3TC1 is such that the call connection thereover is maintained for a predetermined interval of time, or until the calling subscriber goes on hook if this occurs before the end of the predetermined interval of time. Disconnect entry request relay 3DER is not energized, and thus disconnect time and date information is not provided by clock circuit 5CC, until the call connection over trunk circuit 3TC1 is terminated. To preclude charging the calling subscriber for the timing interval after the called party hangs up and before the call connection is terminated by timed disconnect operation, relay 3TOT is energized to provide a timed disconnect indication which is utilized subsequently by charge computer 6CGC during determination of charges for the call. The timed disconnect indication appears as a closure of contact 1 of relay 3TOT, and is reflected via the readout pulse from pulse generator 3PGO on lead 420 through contact 1 and resistor 471 over lead OT to transfer connector circuit 5TRC.

The pulse provided by pulse generator 3PGO on lead TPO1 is also applied over lead 463 to terminal 460. Terminal 460 is connected to one or more of terminals 461, and thus to corresponding leads of trunk identification bus TN, in an arbitrary pattern particularly identifying trunk circuit 3TC1 and trunk register 4TC1. The pulse on lead 463 is thus extended via the connections between terminals 460 and 461 over a particular combination of the leads of bus TN to trouble recorder register 17TRR. If a trouble record is required for the call, as described hereinbelow, the identity of the trunk circuit and trunk register serving the call is thus included in the record.

Lead OT and each of the leads of answer entry bus AEB is individually connected through a diode 579 and a blocking capacitor 580 to one of detector switches 5RD in transfer connector circuit 5TRC. Similarly, each of the leads of initial entry bus IEB is individually connected through a diode 979 and a blocking capacitor 980 to one of detector switches 9RD, except for leads EBA and EBB which are connected through individual diodes 979 and capacitors 980 to detector switches 9CS and 9LS, respectively. Detector switches 5RD and 9RD are each responsive to the appearance of an interrogation pulse on the lead connected thereto to switch to a conducting state, connecting respective potential sources 585 and 985 therethrough and through respective resistors 582 and 982 to the gate electrode of a corresponding one of transfer register switches 5TR, 9TR, 9TR1 and 9TR2.

It will be recalled that the calling subscriber may be designated by a directory number or by an equipment number, depending upon the switching office equipment. This information is a part of the initial entry items registered by sender 7SD1 in trunk register 4TR1 and it is subsequently read out on leads CI of initial entry bus IEB during transfer to the buffer register. The calling subscriber designation appearing on leads CI of bus IEB is reflected through respective ones of detector switches 9RD to the gate electrodes of both transfer switches 9TR1 and tranfer switches 9TR2. Also a part of the initial entry information on bus IEB is an indication on one of leads EBA and EBB of whether the calling subscriber designation on lead CI is a directory number or an equipment number. If the calling subscriber designation is a directory number, an indication will appear on lead EBA to the gate electrode of switch 9CS; or if the calling subscriber is an equipment number, the indication will appear on lead EBB to the gate electrode of switch 9LS.

Concurrently, the conduction of switch 8PTC1 in disconnect entry preference circuit 8DEP connects potential source 835 over lead PTC through resistor 905 to pulse transfer control switch 9PTC in transfer connector circuit 5TRC. Switch 9PTC operates to extend ground therethrough to transfer pulse generator 9PGT. Responsive thereto, pulse generator 9PGT applies a positive transfer pulse on lead PGT to the anode electrode of each of transfer register switches 5TR and 9TR and to the anode electrode of switches 9LS and 9CS. Those ones of transfer register switches 5TR which have negative potential applied to the gate electrode thereof by detector switches 5RD are thus switched to a conducting state to reflect any timed disconnect indication and the answer entry information therethrough to lead OT1 and to the corresponding leads of answer entry bus AEB1 respectively. Similarly, the information appearing on all of the leads of initial entry bus IEB, except for leads CI, EBA and EBB, is reflected through transfer register switches 9TR to corresponding leads of bus IEB1.

If the calling subscriber designation indication is applied on lead EBA to the gate electrode of switch 9CS, indicating that the designation is a directory number, the transfer pulse on lead PGT is applied therethrough over lead 906 to the anode electrode of transfer register switches 9TR1. Thus the individual ones of transfer register switches 9TR1 having negative potential applied to the gate electrode thereof by detector switches 9RD connected to leads CI are switched to a conducting state to reflect the calling subscriber directory number therethrough to the corresponding leads CI1 of initial entry bus IEB1. If, however, the calling subscriber designation indication is applied on lead EBB to switch 9LS, indicating that the designation is an equipment number, the designation must be translated into the proper directory number before it is transferred to bus IEB1. Translator 9TRN is provided for this purpose and may comprise any known translator having an operating speed compatible with that of the present system. The transfer pulse on lead PGT is applied through switch 9LS over lead 907 to the anode electrode of each of transfer register switches 9TR2. The calling subscriber equipment number appearing on leads CI is accordingly directed through switches 9TR2 to translator 9TRN, which provides the corresponding calling subscriber directory number on leads 946 through resistors 947 to the gate electrodes of transfer register switches 9TR3. The transfer pulse on lead PGT is also applied to the anode electrodes of each of switches 9TR3, and thus the calling subscriber directory number on leads 946 is reflected through switches 9TR3 to corresponding leads CI1 of initial entry bus IEB1. The initial and answer information remains registered on register switches 5TR, 9TR, 9TR1, 9TR2 and 9TR3 for the duration of the pulse on lead PGT.

The time and date of disconnect is provided by clock circuit 5CC over bus DE to disconnect entry bus DEB in response to a disconnect signal on lead SCD from disconnect entry preference circuit 8DEP. This disconnect signal is provided on lead SCD by switch 8SDC1 when it switches to a conducting state, as described above, connecting source of potential 835 to lead SCD. The potential on lead SCD through resistors 511 and 512 to ground produces a potential difference across resistor 512, switching switch 5SCD to a conducting state to apply ground therethrough to pulse generator 5PGD. Responsive thereto, pulse generator 5PGD applies a pulse through the operated ones of contacts 1 through M of digit register 5DR, and thence over corresponding leads of bus DE to disconnect entry bus DEB.

When preference diode 16BP1 breaks down to indicate preference to buffer and steering circuit 12BS1, the resulting potential drop across resistor 1113 switches buffer and steering switch 11BSS to a conducting state to extend source of potential 1605 on lead BP1 to one terminal of resistor 1114 connected to the anode electrode of switch 11BES. Conduction of switch 8BES1 in disconnect entry preference circuit 8DEP extends potential over lead BES through diode 1116 and resistor 1115 to the other terminal of resistor 1114 connected to the gate electrode of switch 11BES. The potential difference across resistor 1114 causes switch 11BES to conduct, extending the positive potential from source 1605 therethrough to lead 1150. This completes a conducting path through resistors 1136 and 1137 to source of potential 1135, switching buffer register switch 11BRB to a conducting state to connect source 1135 therethrough on lead BRB1 to actuator electrode 1055 and then through resistor 1054 to ground. Actuator electrode 1055 is situated adjacent gas diodes 1025 in buffer register 10BR1, and thus enables these diodes to register the information appearing on lead OT1 and on busses IEB1, AEB1 and DEB.

The manner of registering the information on lead OT1 and on busses IEB1, AEB1 and DEB in buffer register 10BR1 is similar to that described above in connection with trunk register 4TR1. A bit of information on a lead is applied to one electrode of the respective gas diode 1025 connected thereto, and the other electrode of diode 1025 is connected through resistor 1010, over lead 1020, through resistor 1024 to ground. Concurrence of a bit of information of one binary character applied on a bus lead to one of diodes 1025 and potential applied to electrode 1055 situated adjacent diode 1025 is sufficient to break down diode 1025 to a conducting state. The diode thus broken down is maintained conducting by source of potential 1005, the path therefor being traced from source 1005, through respective diode 1004 and resistor 1003, through diode 1025, respective resistor 1010, lead 1020 and resistor 1024 to ground.

The information transferred from trunk register 4TR1 to buffer register 10BR1 over busses IEB1, AEB1 and DEB is checked for correctness by buffer entry check circuit 13BEK. The information leads of each of these busses is connected through detector switches 10RD and via a corresponding lead over buffer entry check bus BET to check circuit 13BEK. Control potential is extended to check circuit 13BEK over lead BC from disconnect entry preference circuit 8DEP via the above-described operation placing switch 8BC in a conducting state. Responsive to a satisfactory check of the information transferred, check circuit 13BEK provides a release signal over leads DRL and BRL to effect the release of trunk circuit 3TC1 and associated trunk register 4TR1 and to remove the enable potential from actuator electrode 1055 in buffer register 10BR1. Thus the release signal on lead DRL is applied over cable RL through resistors 362 and 361 and diode 360 to lead 330. Potential is applied to lead 330, it will be recalled, over lead DP1 through operated disconnect entry switch 3DES. Conduction through resistor 362 operates switch 3DRL1 to a conducting state to connect lead DRL to source 355, the path therefor being traced through switch 3DRL1, resistors 350, 351 and 352 to source 355. Disconnect release switch 3DRL is consequently operated to complete a path from source 355 through resistor 352, switch 3DRL, operated contact 2 of relay 3TON and resistor 325 to source 321. Switch 3DRL locks up through the path just traced, an alternate locking path therefor being traced from the cathode electrode of switch 3DRL through diode 353, operated contact 1 of relay 3DER and resistor 322 to source 321. Switch 3DRL remains operated until relays 3DER and 3TON have been released upon release of trunk circuit 3TC1 by the common control switching equipment in accordance with the Busch patent.

Concurrently, the release signal on lead BRL from check circuit 13BEK is applied over cable CBL through resistors 1162 and 1161 to lead 1150. Potential is applied to lead 1150 from buffer and steering preference circuit 16BSP over lead BP1 through operated switches 11BSS and 11BES. Switch 11BRL1 is operated to a conducting state, due to the potential difference across resistor 1162 in the above circuit path, completing a path from lead BRL through switch 11BRL1 and resistors 1156, 1157 and 1158 to source of potential 1155. Buffer release switch 11BRL is thus operated to complete a path from source 1155 through resistor 1158, switch 11BRL, operated contact 1 of relay 11BON and resistor 1112 to source 1111. Switch 11BRL locks up through this path and remains conducting until relay 11BON is released.

The above-traced locking paths for operated switch 3DRL function to shunt switch 3DES, causing switch 3DES to return to a nonconducting state, thereby breaking the path between lead DP1 and lead 330, returning switches 3TPO and 3DRL1 to a nonconducting state. Diodes 8DP1 and 8CDP are also returned to a nonconducting state, releasing disconnect preference circuit 8DEP and returning each of switches 8MDP, 8SCD1, 8BC, 8BES1 and 8PTC1 to a nonconducting state. Release of switch 8SCD1 removes potential from lead SCD to switch 5SCD in clock circuit 5CC, returning switch 5SCD to a nonconducting state. Release of switch 8BC removes the control potential from lead BC to check circuit 13BEK, causing check circuit 13BEK to remove the release signal from leads DRL and BRL. Release of switch 8PTC1 returns switch 9PTC to a nonconducting state. Release of switch 8BES1 removes gating potential from lead BES to buffer entry switch 11BES, returning switch 11BES to a nonconducting state.

The above-traced locking path for switch 11BRL through operated contact 1 of relay 11BON functions to shunt switch 11BSS, returning it to a nonconducting state. When the first of switches 11BSS and 11BES is returned to a nonconducting state, source 1605 is disconnected from lead 1150, thereby releasing switches 11BRL1 and 11BRB. Release of switch 11BRB removes potential from actuator electrode 1055 in buffer register 10BR1. Diode 16BP1 is also returned to a nonconducting state, releasing switches 16MBP and 16IBS1 in buffer and steering preference circuit 16BSP, thus removing potential from lead IBS to switch 8IBS in disconnect entry preference circuit 8DEP.

At this point then the information stored in trunk register 4TR1 has been transferred to buffer register 10BR1, the disconnect time and date have been registered in register 10BR1, and preference circuits 8DEP and 16BSP, transfer circuit 5TRC, and busses IEB, AEB, IEB1, AEB1 and DEB have been released for subsequent use. All of the switches in trunk circuit 3TC1 have been returned to a nonconducting state, except for release switches 3ARL and 3DRL. Release switches 3ARL and 3DRL are returned to a nonconducting state when the switching equipment releases trunk circuit 3TC1 for use on subsequent calls, de-energizing relays 3AER, 3DER and 3TON. De-energization of relay 3TON, via release of contact 3 thereof, also interrupts the sustaining potential path for diodes 425 and 426 in trunk register 4TRI, returning each of diodes 425 and 426 to a nonconducting state.

*Call charge entry in buffer register*

When release switch 11BRL in buffer and steering circuit 12BS1 is operated to a conducting state, a path is completed from source 1155, through resistor 1158 and switch 11BRL, over lead 1151, through resistors 1121 and 1122, operated contact 2 of relay 11BON and resistor 1123 to source of potential 1120. Conduction through resistors 1122 switches charge or computer request switch 11CCR to a conducting state, extending source 1120 therethrough and through resistor 1124 over lead CP1 to charge computer preference circuit 16CCP. If none of the other preference circuits connected to preference controller 8PC have been granted preference, the potential level on lead MP through resistor 1612 to one electrode of master charge computer preference diode 16CCPD is sufficient to effect the breakdown and conduction of diode 16CCPD and of diode 16CP1 connected to lead CP1.

Breakdown of diodes 16CCPD and 16CPI results in current flow through resistors 1124 which is detected by computer control switch 11CCS. Switch 11CCS conducts to connect lead CP1 therethrough to lead 1152 through resistors 1173 and 1174 to source of potential 1175. Buffer read out switch 11BPO is switched to a conducting state to apply negative potential from source 1175 to pulse generator 11PGO. Responsive thereto, pulse generator 11PGO provides a negative interrogation pulse over lead BPO1 to lead 1020 and through resistors 1010 to each of gas diodes 1025. Individual ones of diodes 1025 which are in a conducting state, registering bits of information of one binary character, pass the interrogation pulse on lead 1020 therethrough to corresponding leads of busses IEB1, AEB1 and DEB. In this manner the initial, answer and disconnect information stored in buffer register 10BR1 is nondestructively read out on busses IEB1, AEB1 and DEB. If diode 1025 connected to lead OT1 is conducting, registering a timed disconnect indication, the interrogation pulse on lead 1020 is passed therethrough to lead OT1.

The pulse provided by pulse generator 11PGO on lead BPO1 to lead 1020 is also supplied over lead 1063 to terminal 1060. Terminal 1060 is connected to one or more of terminals 1061, and thus to corresponding leads of buffer identification bus BN, in an arbitrary pattern identifying buffer and steering circuit 12BS1 and buffer register 10BR1. The pulse on lead 1063 is thus extended via the connections between terminals 1060 and 1061 over a particular combination of the leads of bus BN to trouble recorder register 17TRR. If a trouble record is required for the call, as described below, the identity of the buffer register and buffer and steering circuit serving the call is thus included in the record.

Lead OT1 and each of the information leads of busses IEB1, AEB1 and DEB is individually connected through a blocking capacitor 680 and a resistor 681 to potential source 682 in computer detector circuit 6DC. Individual detector switches 6DS are connected across each resistor 681 so as to detect an interrogation pulse applied through a conducting diode 1025 to the respective lead. Detector switch 6DS switches to a conducting state, in response to an interrogation pulse on the respective lead, to connect the respective source of potential 682 through diode 683 and resistors 684 and 685 in computer connector circuit 6CC to lead 650. Connector control switch 6WGC connected to lead 650 permits the transmission of the detected information through connector circuit 6CC to register circuit 6RC upon initiation of a check of the information by computer check circuit 13CCK.

Concurrently, therefore, the information on busses IEB1, AEB1 and DEB is provided through detector switches 10RD over check bus BET to computer check circuit 13CCK. Operation of check circuit 13CCK is initiated by a control signal on lead CCC from charge computer preference circuit 16CCP. The control signal is applied to lead CCC via operation of switches 16MCP and 16CCC when preference is granted to charge computer preference circuit 16CCP. Conduction through resistor 1612 upon breakdown of diodes 16CCPD and 16CP1 switches master preference switch 16MCP to a conducting state to connect lead MP therethrough and through resistors 1613, 1614 and 1615 to source of potential 1616. Switch 16CCC connected across resistor 1614 is thus caused to conduct to extend potential source 1616 over lead CCC to check circuit 13CCK. Check circuit 13CCK extends the control signal over lead WGC and cable COM through resistors 603 and 604 to potential source 605. Switch 6WGC is caused to conduct, connecting source 605 therethrough and over lead 605 through respective resistors 685 and 684, diode 683 and conducting ones of detector switches 6DS to source 682, thereby switching corresponding ones of connector switches 6CS to a conducting state.

Conduction of a connector switch 6CS extends the connection from source 682 through the corresponding conducting detector switch 6DS, respective diode 683, switch 6CS, resistors 686 and 687, over lead 660 to the cathode electrode of register control switch 6PRWC. Switch 6PRWC is normally maintained in a conducting state by the circuit traced from source 630 through resistors 632 and 633 to source 634 to connect potential source 634 therethrough to lead 660. Individual computer register switches 6RS in computer register circuit 6RC are connected across respective ones of resistors 687. Accordingly, the information appearing on lead OT1 and on busses IEB1, AEB1 and DEB is detected by detector switches 6DS and is reflected through connector switches 6CS to computer register switches 6RS. The information thus registered in register switches 6RS is locked in via a path which may be traced from source 634 through switch 6PRWC over lead 660 through the conducting ones of switches 6RS and through respective resistors 688 to potential sources 690.

Assuming a satisfactory check of the information on busses IEB1, AEB1 and DEB, check circuit 13CCK applies a check signal on lead STWC over cable COM to computer start control switch 6STWC and on lead CCRL to computer preference circuit 16CCP. The signal on lead STWC from check circuit 13CCK is applied through resistors 622, 623 and 624 to potential source 625, causing computer start control switch 6STWC to conduct. Switch 6STWC locks over a path traced from source 625 through resistor 624, switch 6STWC and resistor 691 to source 692. Switch 6STWC connects source 625 through resistor 624 over lead 629 and through resistors 626 and 627 to source 628, switching charge computer start switch 6STCC to a conducting state. Source 628 is extended through conducting switch 6STCC to charge computer 6CGC to initiate translation of the initial, answer and disconnect information registered in computer register 6RC into a charge for the call. Charge computer 6CGC comprises known translation circuitry for determining a charge rate for the call based upon the identities of the calling and called subscribers, for determining the duration of the call from the answer and disconnect information and from any timed disconnect indication, and for determining the charges for the call based upon the charge rate and the duration thereof. Charge computer 6CGC works on a single-call-at-a-time basis and, advantageously, comprises electronic translation circuitry such as that shown for example in R. C. Avery-R. H. Gumley-A. Majlinger application Serial No. 162,162, filed December 26, 1961.

The charges computer for the call are provided by charge computer 6CGC over the leads of charge entry bus CEB for registration in buffer register 10BR1 along with the other items of information pertaining to the call. It will be recalled that upon buffer and steering circuit 12BS1 being granted computer preference, the potential on lead MP is extended through computer preference circuit 16CCP over lead CP1 through switch 11CCS to lead 1152 to operate switch 11BPO. The potential on lead 1152 also functions, via the path through resistors 1177 and 1176 to source 1178, to operate switch 11CRB. Switch 11CRB connects potential source 1178 over lead CRB1 to actuator electrode 1056 and through resistor 1057 to ground. Actuator electrode 1056 is thus enabled to effect registration of the charge entry information on bus CEB in gas diodes 1026 situated adjacent electrode 1056. The charge entry information is maintained registered in diodes 1026 by potential source 1005 through a path which may be traced from source 1005 through respective diodes 1004 and resistors 1003, over the leads of bus CEB, through conducting ones of diodes 1026 and respective resistors 1008 to lead 1021, through resistor 1009 to ground.

Responsive to a satisfactory check of the information transferred from buffer register 10BR1 to computer register 6RC, it will be recalled, check circuit 13CCK applies a signal over lead CCRL to computer preference circuit 16CCP. The signal on lead CCRL is extended through resistors 1621 and 1620, through master preference switch 16MCP to lead MP, the potential across resistor 1621 switching computer release switch 16CCRL to a conducting state. Switch 16CCRL completes a locking path from lead MP through switch 16MCP, resistor 1620, switch 16CCRL and resistors 1622, 1623 and 1624 to source 1625, shunting switch 16CCC. Switch 16CCC is thus returned to a nonconducting state, removing the potential from lead CCC to check circuit 13CCK. Check circuit 13CCK is released, removing the signals from leads WGC, STWC and CCRL, thereby releasing switch 6WGC. Switches 6STWC and 16CCRL are maintained in a conducting state by the locking paths traced hereinabove.

When charge computer 6CGC completes its operation, providing the call charge information on bus CEB, a release signal is applied thereby to lead 695 to initiate release of computer register 6RC. The release signal on lead 695 is applied over lead 618, through resistors 619 and 620 to source 621, switching release switch 6RLC to a conducting state. Switch 6RLC connects source 621 therethrough to pulse generator 6PGR. Responsive thereto, pulse generator 6PGR applies a positive potential release pulse to lead 629 which returns switch 6STWC to a nonconducting state. Therefore, when the release pulse on lead 629 terminates, switch 6STCC is also returned to a nonconducting state. The signal from charge computer 6CGC on lead 695 is also applied through resistors 614 and 616 to source 615, switching switch 6ERWC1 to a conducting state. Switch 6ERWC1 connects source 615 through resistors 611 and 612 to source 613, operating erase switch 6ERWC to a conducting state to extend source 613 to erase pulse generator 6PGW. Pulse generator 6PGW applies a brief positive potential erase pulse through diode 661 to lead 660, which holds the conducting ones of switches 6RS operated, and through diode 662 to the gate electrode of switch 6PRWC. Switch 6PRWC is switched thereby to a nonconducting state, and the initial, answer and disconnect information registered in register 6RC is erased by the interruption of the locking path for switches 6RS upon termination of the erase pulse on lead 660. After a period determined by capacitor 631, switch 6PRWC is again switched to a conducting state over the path previously traced to reconnect potential source 634 to lead 660. Computer register 6RC is then restored to normal, ready for registration of information pertaining to another call.

Conduction through resistor 1623 via the locking path traced above for switch 16CCRL switches charge entry control switch 16CEC to a conducting state, thereby extending source 1625 therethrough over lead CEC to charge entry check circuit 13CEK. The charge entry information provided by charge computer 6CGC on charge entry bus CEB for registration in buffer register 10BR1 is also applied over check bus CET to check circuit 13CEK. Assuming a satisfactory check of the charge entry information, check circuit 13CEK applies negative potential over lead CERL and cable CBL through resistors 1142 and 1141 to lead 1152 in buffer and steering circuit 12BS1. Switch 11CRL2 is operated to extend lead CERL therethrough and through resistors 1144, 1145 and 1146 to source 1147. Charge entry release switch 11CERL is switched to a conducting state and locks up, connecting source 1147 through resistor 1146, switch 11CERL to lead SC1, and through diode 1125, operated contact 2 of relay 11BON and resistor 1123 to source 1120.

The locking path just traced for switch 11CERL shunts computer request switch 11CCR, returning switch 11CCR to a nonconducting state. Switch 11CCS is thus released, returning switches 11BPO, 11CRB and 11CRL2 to a nonconducting state. Release of switch 11CRB removes the enabling potential from lead CRB1 to electrode 1056. Release of switch 11CCR breaks the sustaining path over lead CP1 for diodes 16CP1 and 16CCPD in preference circuit 16CCP, returning these diodes to a nonconducting state. Preference switch 16MCP is thus release, breaking the locking path for switch 16CCRL which then releases. Switch 16CEC returns to a nonconducting state, removing potential from lead CEC to check circuit 13CEK. Check circuit 13CEK consequently releases to remove the check signal from lead CERL. Switch 11CERL remains conducting via the path traced through operated contact 2 of relay 11BON, as does switch 11BRL via a path earlier traced through operated contact 1 of relay 11BON.

*Transmission of call information to hotel*

At this point then all of the information pertaining to the illustrative call over trunk circuit 3TC1 necessary for billing the calling subscriber, inclusive of the call charges, is registered in buffer register 10BR1 on gas diodes 1025 and 1026. Potential from source 1147 extended through operated switch 11CERL on lead SC1 is directed to recorder control switch 11RSC, to sending control switch 12SSC and to position control switch 12PSC. A portion of the initial entry information registered in buffer register 10BR1 on diodes 1025 connected to leads TTYK, POSK, TTY and POS of initial entry bus IEB1 indicates whether the call information is to be directed to an operator's position circuit or to circuitry for transmission to a hotel or similar establishment. It was initially assumed herein that the illustrative call over trunk circuit 3TC1 derived from a hotel to which the call charges were to be communicated immediately upon termination of the call. Therefore, the initial entry information transferred to buffer register 10BR1 included an information bit on each of leads TTY and POSK, placing diodes 1025 connected thereto in a conducting state, indicating that the call information is to be directed from buffer register 10BR1 to charge communication transmitting equipment 18CCT only and not to position circuit 15POS. The diodes 1025 connected to leads TTYK and POS remain in a nonconducting state.

An individual detector switch 10TDN, 10PDN, 10TD and 10PD is connected across the resistors 1010 in circuit with diodes 1025 connected to leads TTKY, POSK, TTY and POS, respectively. These detector switches are individually switched to a conducting state upon breakdown and conduction of corresponding diode 1025. Thus, breakdown of diodes 1025 connected to leads TTY and POSK, indicating transmission of the call charges to a hotel, is detected by switches 10TD and 10PDN, respectively, to connect the potential on lead 1020 therethrough to leads SR1 and NPR. Lear SR1 is connected through resistors 1180, 1181 and 1182 to source 1183. The potential across resistor 1181 switches switch 11SR1 to a conducting state, connecting source 1183 therethrough over lead SR through resistor 1207 to sending request switch 12SR. Potential is applied through switch 11CERL over lead SC1 through resistor 1205 to control switch 12SSC. Therefore, switches 12SSC and 12SR operate to complete a path form source 1201 through resistor 1202, operated contact 4 of relay 11BON, switch 12SSC, switch 12SR, resistor 1208, over lead SP1 to preference diode 16SP1 in sending preference circuit 16TSP.

Preference circuit 16TSP operates in a manner similar to the preference circuits previously described herein. If charge communication transmitting equipment 18CCT is free, negative potential from source 1801, through resistor 1802, over lead SI, through resistors 1630 and 1631 to lead MP operates switch 16SI to a conducting state. This extends potential on lead MP through switch 16SI and resistor 1632 to master sending preference diode 16CSP. Assuming no other preference circuit or buffer and steering circuit has been granted preference, the potential across diodes 16CSP and 16SP1 is sufficient to effect their breakdown.

Breakdown of diode 16SP1, granting preference to buffer and steering circuit 12BS1, is detected by sending switch 12SS. Switch 12SS operates to connect the potential on lead SP1 therethrough, over lead SL, through diode 1209, over lead PS, through resistors 1210 and 1211 to source 1212. The potential difference across resistor 1211 switches buffer readout switch 12BPO1 to a conducting state, extending source 1212 therethrough to pulse generator 12PGO. Responsive thereto, pulse generator 12PGO applies a negative potential interrogation pulse over lead BPO11, through diode 1022 to lead 1020 and through diode 1023 to lead 1021. The interrogation pulse on leads 1020 and 1021 passes through the conducting ones of diodes 1025 and 1026, respectively, to the corresponding leads of busses IEB1, AEB1, DEB and CEB connected thereto. The interrogation pulse on lead 1020 is also extended via the connections between terminals 1060 and 1061 over the leads of bus BN to trouble recorder register 17TRR.

Each of the leads of busses IEB1, AEB1, DEB and CEB, except leads TTYK, POSK, TTY and POS, is individually connected through a blocking capacitor 1080 to one of the output detector switches 10RD. Detector switches 10RD are each responsive to the appearance of an interrogation pulse on the bus lead connected thereto to switch to a conducting state, connecting respective potential source 1085 therethrough to the corresponding leads of output busses BEO and CEO. In this manner the call information registered in buffer register 10BR1 is nondestructively read out on output busses BEO and CEO, and is directed thereover to recorder connector circuit 14CC, to position connector circuit 15CC, and to sending connector circuit 18CC.

The information read out of buffer register 10BR1 on busses BEO and CEO is also directed over busses BET and CET to sending check circuit 13TSK, to position check circuit 13PK, and to recorder check circuit 13RK. Granting of preference to buffer register 10BR1 for access to transmitting equipment 18CCT is detected by master preference switch 16MSP which operates to connect the potential on lead MP therethrough to switch sending check control switch 16SC to a conducting state. Switch 16SC extends potential from source 1635 as a control signal over lead SC to initiate operation of check circuit 13TSK.

The control signal on lead SC is extended by check circuit 13TSK over lead WGT through resistor 1803 to connector control switch 18WGT, causing switch 18WGT to conduct to connect source of potential 1805 therethrough over lead 1850 to sending connector circuit 18CC. Connector circuit 18CC comprises circuitry similar to that described above in connection with computer connector circuit 6CC, and is enabled by the potential on lead 1850 to direct the information on busses BEO and CEO to sending register circuit 18RC. Register control switch 18PRWT is in a conducting state and extends source of potential 1834 therethrough on lead 1860 to register circuit 18RC, thereby enabling register circuit 18RC to register the call information directed thereto.

Check circuit 13TSK performs a check of the information on busses BEO and CEO, and assuming the check is satisfactory, applies a check signal to leads STWT and SRL. The check signal on lead STWT from check circuit 13TSK switches sending start control switch 18STWT to a conducting state, switch 18STWT up to extend source 1825 therethrough on lead 1829 through resistor 1826 to start switch 18STCT. Start switch 18STCT operates to connect potential source 1828 to charge communication transmitting equipment 18CCT, initiating its operations to transmit the call information registered in register circuit 18RC over an appropriate communications link (not shown) to the hotel.

The positive potential from source 1825 extended through switch 18STWT is also directed through diode 1809 to lead SI as an indication that charge communication transmitting equipment 18CCT is busy. The positive potential on lead SI returns switch 16SI in sending preference circuit 16TSP to a nonconducting state, disconnecting preference circuit 16TSP from lead MP.

Concurrently, the signal from check circuit 13TSK on lead SRL is applied through diode 1213 and resistors 1214 and 1215 to lead SL in buffer and steering circuit 12BS1. Switch 12SRL1, connected across resistor 1214, operates to connect lead SRL therethrough and through resistors 1216, 1217 and 1218 to source 1219. The potential across resistor 1217 switches sending release switch 12SRL to a conducting state, and switch 12SRL locks up through a path which may be traced from source 1219 through resistor 1218, switch 12SRL, diode 1203, operated contact 4 of relay 11BON and resistor 1202 to source 1201. This path functions to shunt switch 12SSC, thus returning switches 12SSC, 12SR and 12SS to a nonconducting state. Potential is removed from leads SL and PS by the release of switch 12SS and thus switches 12SRL1 and 12BPO1 are returned to a nonconducting state. Diodes 16SP1 and 16CSP are returned to a nonconducting state. Switch 16MSP, and thus switch 16SC, are returned to a nonconducting state, removing potential from lead SC to check circuit 13TSK. Check circuit 13TSK releases, removing the signal from leads SRL, STWT and WGT. Removal of the signal from lead WGT releases switch 18WGT to disconnect source 1805 from lead 1850 to sending connector circuit 18CC. Switches 18STWT and 12SRL remain operated via locking paths traced above.

The operation of release switch 12SRL also connects source 1219 therethrough over lead SRL2, through resistor 1184 to switch 11SRL2. The potential extended on lead NPR by detector switch 10PDN, upon registration of the initial entry information in buffer register 10BRE, switches negative position request switch 11NPR to a conducting state via an obvious path. Switch 11NPR operates to connect source 1186 therethrough and through register 1187 to switch 11PRL2. Switches 11SRL2 and 11PRL2 are thus enable to extend source of potential 1190 to release pulse generator 11PG upon operation of switch 11RRL2. Switch 11RRL, and thus switch 11RRL2, operate to a conducting state upon a satisfactory check of the information provided to idle recorder circuit 14REC, as will be described hereinbelow.

Assuming recording of the information has been completed and that switches 11RRL and 11RRL2, as well as switches 11PRL2 and 11SRL2, have been switched to a conducting state, source 1190 is extended through these switches to pulse generator 11PG. Responsive thereto, pulse generator 11PG applies a positive release pulse through diode 1103 over lead ER1 to each of leads 1020 and 1021 in buffer register 10BR1. The release pulse decreases the potential across gas diodes 1025 and 1026 to a level insufficient to maintain their conduction. Each of diodes 1025 and 1026 in buffer register 10BR1 is thus placed in a nonconducting state ready for the registration of information pertaining to a subsequent call. Switches 11SR1 and 11NPR are returned to a nonconducting state, as are switches 11SRL2 and 11PRL2.

The positive release pulse from pulse generator 11PG is also directed through diode 1104 to relay 11BON. Relay 11BON is de-energized for the duration of the release pulse, which may be on the order fifty microsecond in an illustrative embodiment, and upon cessation of the release pulse is energized again via the obvious path from source 1101 to ground. During the period that relay 11BON is de-energized, contacts 1, 2, 4 and 5 thereof are released to interrupt the locking paths for switches 11BRL, 11CERL, 12SRL and 11RRL, respectively. Buffer register 10BR1 and buffer and steering circuit 12BS1 are accordingly restored to normal; and upon cessation of the release pulse and consequent energization of relay 11BON, source 1111 is again extended through operated contact 1 of relay 11BON over lead BP1 to request preference from buffer and steering preference circuit 16BSP.

When charge communication transmitting equipment 18CCT completes communication of the call information to the hotel, a positive release signal is applied thereby to lead 1895, energizing switches 18RLT and 18ERWT1 via obvious paths. Switch 18ERWT1 operates to extend negative potential from source 1815 through resistor 1811 to switch 18ERWT. Switch 18ERWT operates to connect source 1913 to pulse generator 18PGW. Responsive thereto, pulse generator 18PGW applies a positive release pulse through diode 1861 to lead 1860 and through diode 1862 to switch 18PRWT. Switch 18PRWT is switched to a nonconducting state thereby; and upon cessation of the release pulse on lead 1860, the information registered in register circuit 18RC is erased. Switch 18PRWT returns to a conducting state, after a time determined by capacitor 1831, to connect source 1834 again to lead 1860 for registration of information pertaining to a subsequent call.

Operation of switch 18RLT extends negative potential from source 1821 to pulse generator 18PGR, which applies a positive pulse to the cathode electrode of switch 18STWT. Switch 18STWT is returned thereby to a nonconducting state. Upon cessation of the pulse generator 18PGR, switch 18STCT is released to a nonconducting state, disconnecting source 1828 from transmitting equipment 18CCT. The potential on lead SI goes negative upon release of switch 18STWT and cessation of the pulse from pulse generator 18PGR, source of potential 1801 being applied through resistor 1802 to lead SI. Negative potential on lead SI, it will be recalled, switches switch 16SI in sending preference circuit 16TSP to a conducting state to indicate that transmitting equipment 18CCT is idle.

*Operator-served calls*

The call charges may be displayed advantageously at an operator's position on operator-served calls, for example, when the calling party requests the charges. To initiate this service on a call, an indication is provided in the initial entry information on lead POS which switches the diode 1025 connected thereto to a conducting state upon transfer of the information to the buffer register. For example, this indication may be keyed in by the operator serving the call. The indication which otherwise appears on lead POSK is not present. Normally, in the case of operator-served calls of this type, transmission of the charges to the calling subscriber is not required and thus an indication thereof appears on lead TTYK, which switches diode 1025 connected thereto to a conducting state. Accordingly, when the initial entry information is transferred to buffer register 10BR1, detector switches 10PD and 10TDN detect the presence of these indications to connect the potential on lead 1020 to leads PR1 and NSR, respectively.

The subsequent operation of the call charge determination system is substantially the same as for non-operator-served calls such as described above. The potential on lead NSR operates negative sending request switch 11NSR, and the potential on lead PR1 operates switch 11PR1 which extends source 1185 over lead PR to operate position request switch 12PR. Switch 12PSC is operated by the signal on lead SC1 from switch 11CERL. Thus a preference request is extended over lead PP1 to position preference circuit 16PP. Negative potential from source 1501 on lead PI operates switch 16PI to indicate that position circuit 15POS is idle. When preference is subsequently granted to buffer and steering circuit 12BS1, position switch 12PS operates to connect lead PP1, over lead PL, through diode 1220, over lead PS to buffer readout switch 12BPO1. Switch 12BPO1 operates as above to effect readout of the call information on output busses BEO and CEO.

Granting of preference also extends control potential from source 1645 through operated switch 16PC over lead PC to position check circuit 13PK. Check circuit 13PK applies the control potential on lead PC over lead WGP to position connector control switch 15WGP to enable position connector circuit 15CC to gate the information to position register circuit 15RC. Assuming a satisfactory check of the information read out on busses BEO and CEO, check circuit 13PK applies a check signal on lead STWP to position start control switch 15STWP to initiate operation of position circuit 15POS for display to the operator of the information in register circuit 15RC and to indicate to preference circuit 16PP that position circuit 15POS is busy. Check circuit 13PK also applies a check signal on lead PRL to operate switch 12PRL1, and thus position release switch 12PRL which locks up through contact 3 of relay 11BON. Operation of position release switch 12PRL effects the release of switches 12PSC, 12PR, 12PS, 12BPO1 and 12PRL1 in buffer and steering circuit 12BS1, and thus releases preference circuit 2PP, thereby releasing check circuit 13PK. When recorder information check is completed, operating switch 11RRL2, the conducting state of position release switch 12PRL, extending source 1225 over lead PRL2, operates switch 11PRL2. Switch 11SRL2 is operated by switch 11NSR, and thus pulse generator 11PG is energized to erase the information from buffer register 10BR1 in the manner described above. At the same time, relay 11BON is pulsed off to release switches 11CERL, 11BRL, 11PRL and 11RRL. When relay 11BON is again energized, operated contact 1 thereof extends source 1111 over lead BP1 to buffer preference circuit 16BSP to request preference.

When the display of the information at position circuit 15POS is terminated, a signal therefrom effects the momentary release of switch 15PRWP to erase the information registered in register circuit 15RC and also releases switch 15STWP, returning the position circuit idle indication over lead PI to position preference circuit 16PP.

*Recording of call charges*

The information pertaining to each toll call is also directed over output busses BEO and CEO to recorder circuit 14REC for producing a complete and permanent record of the individual calls. Magnetic tape recording apparatus may be utilized advantageously in recorder circuit 14REC for these purposes. All of the information pertaining to an individual call is provided in parallel over busses BEO and CEO and is thus recorded contiguously, which simplifies the processing required in subsequently assembling the calling subscriber's periodic statement of charges.

It will be recalled that when the charge entry has been registered in buffer register 10BR1 along with the other items of information pertaining to the call, release switch 11CERL is operated to release the charge computer request circuit. Switch 11CERL also extends source 1147 over lead SC1 and lead RS, through resistor 1191 to recorder control switch 11RSC. Switch 11RSC conducts to extend negative potential from source 1192, through resistor 1193, operated contacts 5 of relay 11BON, switch 11RSC and resistor 1194, over lead RP1 to recorder preference circuit 16RP. Negative potential from source 1401 on lead RI operates recorder idle switch 16RI to indicate that recorder circuit 14REC is idle. Thus, when recorder preference is granted to buffer and steering circuit 12BS1, diodes 16RP1 and 16CRP break down and conduct, operating switch 16MRP and switch 16RC to connect source 1655 over lead RC to recorder check circuit 13RK, through which source 1655 is extended over lead WGR to switch 14WGR. Breakdown and conduction of diodes 16RP1 and 16CRP is detected by switch 11RS which connects lead RP1 therethrough over lead RL and lead BPO2, through diode 1221 and resistors 1210 and 1211 to source 1212. Switch 12BPO1 is thus operated, enabling pulse generator 12PGO to read out the information from buffer register 10BR1 on busses BEO and CEO in the manner described above.

Figure 14:
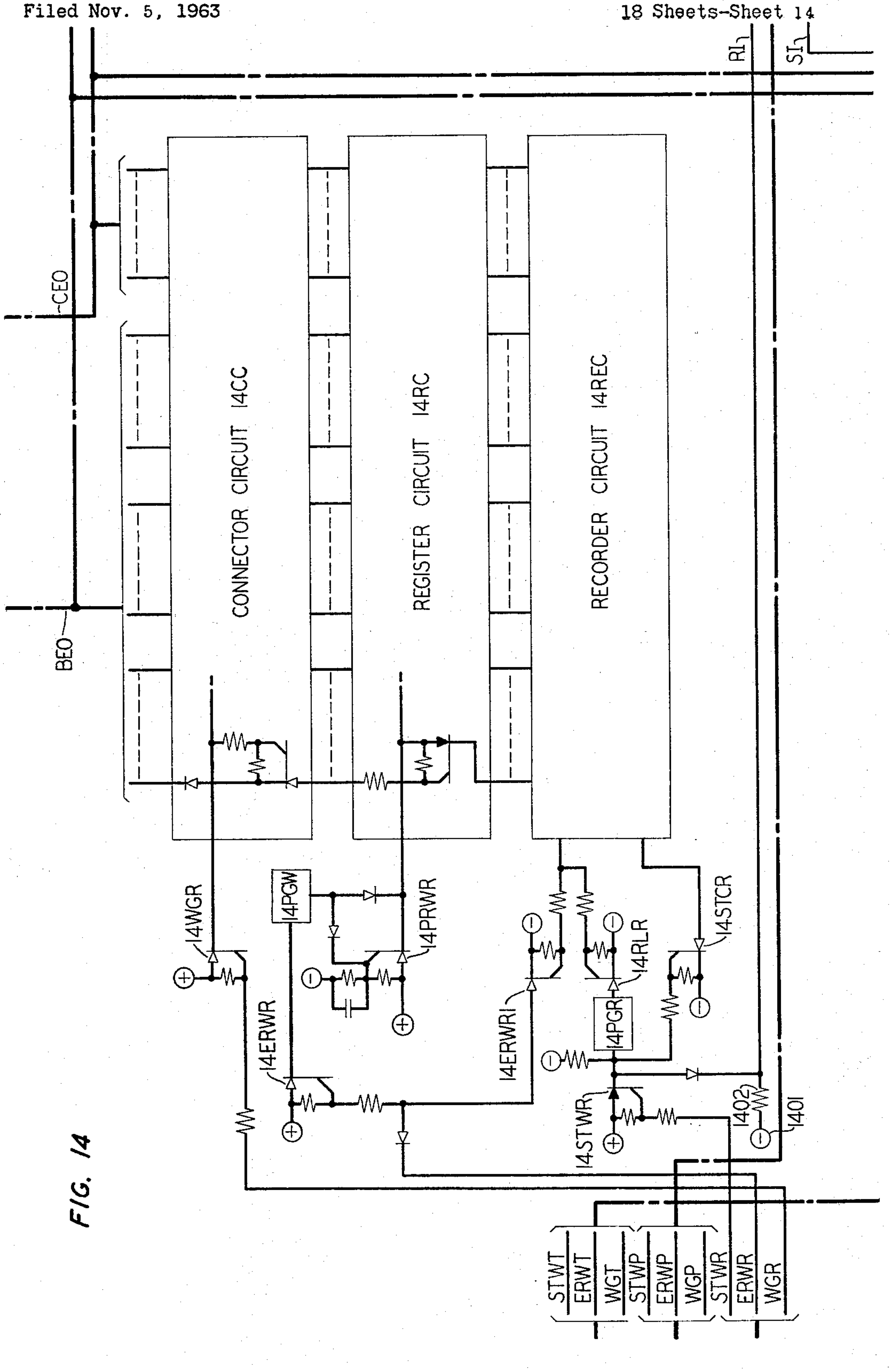
Figure 15:
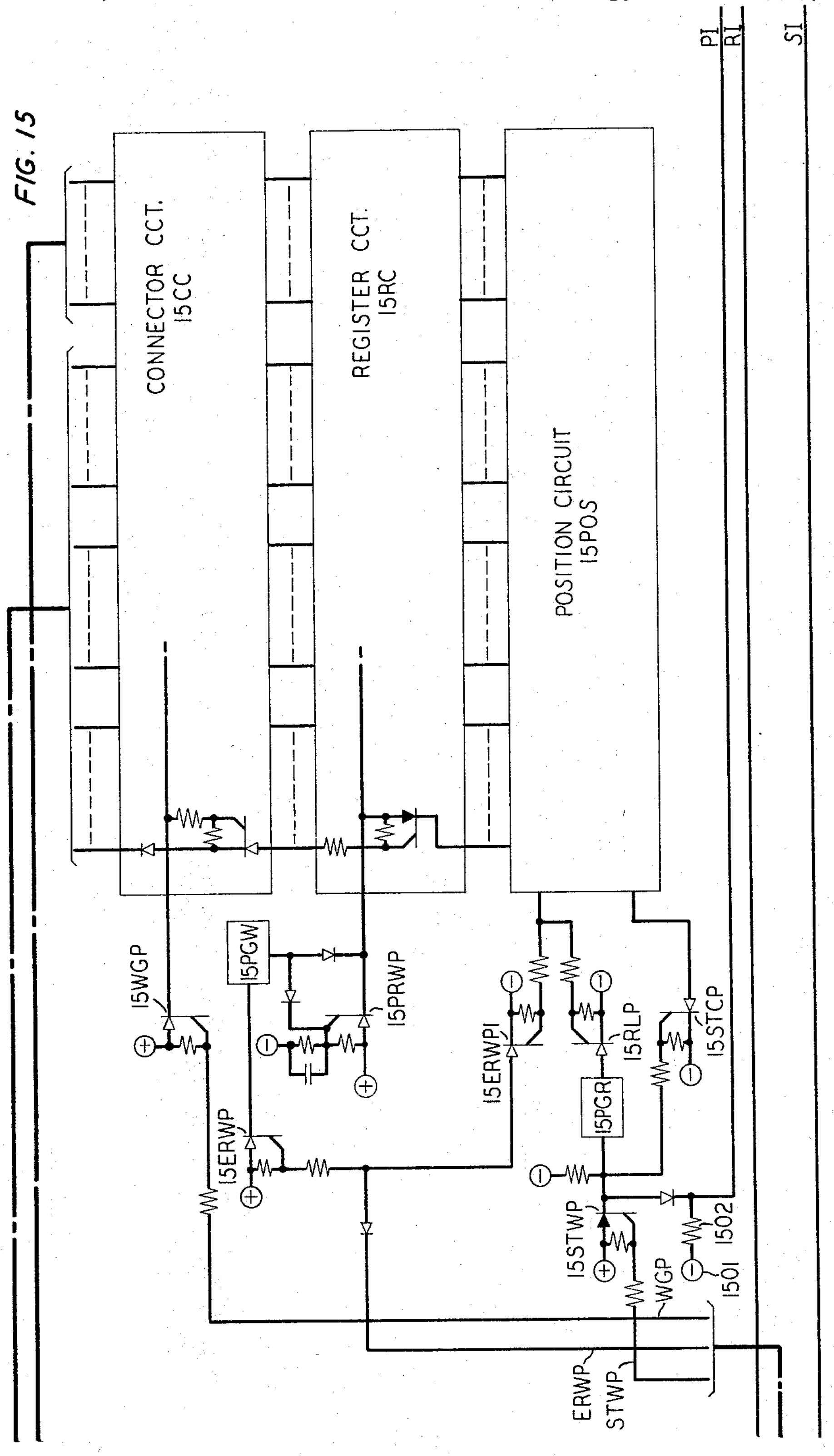

Upon a satisfactory check by recorder check circuit 13RK, a check signal is applied thereby over lead STWR to recorder start control switch 14STWR, and over lead RRL to switch 11RRL1. The operation of the connector, register and recorder control circuitry in FIG. 14 is substantially similar to that described in connection with charge communication transmitting equipment 18CCT and need not be described in detail here. The call information is registered in recorder register circuit 14RC, recorder circuit 14REC is made busy and recorder operation is initiated.

The signal on lead RRL from check circuit 13RK to switch 11RRL1 is directed through resistors 1195 and 1196 to lead RL, switching switch 11RRL1 to a conducting state to connect lead RRL therethrough and through resistor 1197 to recorder release switch 11RRL. Release switch 11RL operates to connect source 1198 therethrough over lead RRL2 to switch 11RRL2. Switch 11RRL2 conducts to extend source 1190 therethrough to switches 11PRL2 and 11SRL2 and, upon their operation in the manner described above, to pulse generator 11PG to erase the information in buffer register 10BR1.

*Trouble recording operation*

During each of the information transfer operations over busses IEB, AEB, IEB1, AEB1, DEB and CEB, the information being transferred is directed to an appropriate one of check circuits 13IEK through 13RK. At the same time the information is directed over cable TT and is registered in trouble recorder register 17TTR, if trouble recorder 17TR is idle. In each instance above it has been assumed that a check of the information proved satisfactory. Upon a satisfactory check, indicating that no trouble record is to be made at this point, the particular check circuit involved applies an erase signal over lead ERT to effect erasure of the information registered in trouble recorder register 17TRR. However, if an error is detected in the information pertaining to a call, the appropriate check circuit initiates a trouble release of the call charge determination system to preclude erroneous charges on the call and directs the recording of the registered information by trouble recorder 17TR. Included as a part of the trouble record for maintenance purposes is the identity of the sender, trunk circuit or buffer and steering circuit involved in the information transfer operation wherein the error occurs.

For example, assume that check circuit 13CCK detects an error in the information read out from buffer register 10BR1 on busses IEB1, AEB1 and DEB to charge computer register 6RC. Thus, instead of providing a satisfactory check signal on leads CCRL and STWC, check circuit 13CCK applies an unsatisfactory check signal on lead BTR over cable CBL through diode 1148 to buffer trouble release switch 11BTR in buffer and steering circuit 12BS1. It will be recalled that during this information transfer operation potential is extended through operated switch 11CCS to lead 1152, which is connected through diode 1171 and resistors 1139 and 1140 to release switch 11BTR. Switch 11BTR, therefore, conducts to connect lead BTR therethrough to lead BTR1. Lead BTR1 is connected over obvious paths to the gate electrodes of each of release switches 11CERL, 11BRL, 11RRL, 12PRL and 12SRL. The connecting path to release switch 11CERL may be traced, by way of example, through diode 1143 and resistor 1144 to the gate electrode of switch 11CERL. Each of release switches 11CERL, 11BRL, 11RRL, 12PRL and 12SRL is switched to a conducting state and functions to release respective portions of the call charge determination system in the manner described for the individual switches above. Accordingly, pulse generator 11PG is energized to erase the call information registered in buffer register 10BR1 and buffer and steering circuit 12BS1 is released for use on a subsequent call. Check circuit 13CCK also applies a signal over lead ERWC through diode 610 to operate erase switch 6ERWC, thereby effecting erasure of the information in register circuit 6RC in the manner described above. Though not shown in the drawing, it will be apparent that the unsatisfactory check signal on lead BTR may also be employed advantageously to call in an operator on the call in a manner known in the art.

For maintenance purposes, check circuit 13CCK applies a trouble start signal over trouble start lead TRST to initiate a trouble record of the unsatisfactory call information and of the identity of buffer and steering circuit 12BS1 by trouble recorder 17TR. This information is provided to trouble recorder register 17TRR over check bus BET and buffer identification bus BN, respectively, and is registered therein if trouble recorder 17TR is idle, as indicated by a negative potential idle signal over lead TRI to register 17TRR. An idle signal is provided on lead TRI when trouble recorder idle switch 17TRI is operated to a conducting state, the path for operating switch 17TRI being traced from source 1702, through resistor 1703, diode 1704, resistor 1705, contact 1 of relay 17TRC and resistor 1706 to source 1707. Switch 17TRI extends negative potential from source 1707 therethrough on lead TRI and locks up via a path from source 1707 through resistor 1706, contact 1 of relay 17TRC, switch 17TRI, lead TRI, lead 1710 and resistors 1721 and 1711 to source 1712. If trouble recorder 17TR is busy, start switch 17ST will be operated, shunting switch 17TRI through diode 1708 and holding it in a nonconducting state.

Assuming that switch 17TRI is operated to indicate an idle condition, the information is registered in trouble recorder register 17TRR and is applied over bus TRR to trouble recorder 17TR. The idle signal on lead TRI is also directed over lead 1710 through resistors 1721 and 1711 to source 1712, the locking path traced above for switch 17TRI, operating switch 17TRI1. The trouble start signal from check circuit 13CCK on lead TRST is thus extended through resistors 1713 and 1714 and through operated switch 17TRI1 to source 1712. Start control switch 17SC is operated thereby to connect the start signal on lead TRST therethrough and through resistors 1715 and 1716 to source 1717. Start switch 17ST is switched to a conducting state and locks up through contact 2 of relay 17TRC and the coil of start relay 17STT to source 1720. Relay 17STT is operated in this path and closes contact 1 thereof to connect starting ground to trouble recorder 17TR. Operation of start switch 17ST also shunts switch 17TRI to a nonconducting state to indicate that trouble recorder 17TR is busy, thereby removing the idle signal from lead TRI to preclude registration in trouble recorder register 17TRR of information pertaining to another call. Switches 17TRI1 and 17SC are released upon the release of switch 17TRI.

Upon completion of the trouble record, trouble recorder 17TR extends ground through the coil of trouble record complete relay 17TRC to source 1730, energizing relay 17TRC. Operation of contacts 1 and 2 of relay 17TRC interrupts the paths for start switch 17ST and for start relay 17STT, releasing switch 17ST and relay 17STT. Operation of contact 3 of relay 17TRC extends source 1740 over lead ERT to trouble recorder register 17TRR to effect the erasure of the call information registered therein. When relay 17TRC is de-energized by trouble recorder 17TR, contact 1 of relay 17TRC releases to extend source 1707 through resistor 1705. If the system is idle, trouble recorder idle switch 17TRI reoperates to extend an idle indication over lead TRI to trouble recorder register 17TRR to permit registration of call information for a subsequent trouble record. However, if the system is in the process of transferring information at this time, switch 8OB1 and switch 8OB in preference controller 8PC will be conducting to connect negative potential source 806 to office busy lead OB, shunting source 1702 from switch 17TRI, thereby preventing switch 17TRI from operating. This prevents the registration in trouble recorder 17TRR of partial information on the transfer operation in progress, which would yield a false trouble record. When the system subsequently becomes idle, removing source 806 from lead OB, switch 17TRI is operated via the path above-traced.

The operation for effecting trouble release of the call charge determination system and for initiating a trouble record during the other information transfer operations is similar to that just described. Each check circuit is connected via a trouble release lead or leads to the release switches applicable to the particular information transfer operation and is connected via trouble recorder start lead TRST to the trouble recording control circuitry. Further, charge computer 6CGC is connected to trouble release lead BTR and applies a release signal thereto in the event that it is unable to determine the charges for a call.

It is to be understood that the above-described arrangements are but illustrative of the application of the principles of applicant's invention. Numerous other arrangements may be devised by those skilled in the art without departing from the spirit and scope of the invention.

What is claimed is:

1. In a telephone switching system having a plurality of trunk circuits, a plurality of trunk registers individually associated with respective ones of said trunk circuits, means for registering information pertaining to a call connection over one of said trunk circuits in the associated one of said trunk registers, buffer register circuitry, call charge computation means for translating information pertaining to a call connection into charges for said call connection, information transfer busses, means including said information transfer busses operative upon termination of a call connection over one of said trunk circuits for selectively interconnecting the associated one of said trunk registers with said buffer register circuitry for transferring call connection information from said trunk register to said buffer register circuitry, means including said information transfer busses for providing said call connection information to said call charge computation means and for registering said charges for said call connection in said buffer register circuitry, output utilization circuitry, and means including said information transfer busses for providing said call connection information and said charges from said buffer register circuitry to said output utilization circuitry.

2. In a telephone switching system, the combination in accordance with claim 1 wherein each of said trunk registers comprises a plurality of breakdown devices individually interconnected over respective information leads with corresponding ones of said breakdown devices in the other ones of said trunk registers.

3. In a telephone switching system, the combination in accordance with claim 2 wherein said means for registering information in one of said trunk registers comprises means for providing said information over said information leads to each of said trunk registers and means for selectively enabling only the breakdown devices in said associated ones of said trunk registers to register said information.

4. In a telephone switching system, the combination in accordance with claim 3 wherein said information transfer busses includes said information leads and means connected to said information leads for maintaining said information registered in each of said trunk registers until the call connection over the associated trunk circuit has terminated.

5. In a telephone switching system, a plurality of call registers each comprising a plurality of breakdown devices, individual selector means respectively associated with each of said call registers, a plurality of information transfer conductors interconnecting corresponding ones of said breakdown devices in each of said call registers, means responsive to the initiation of a call connection for energizing an individual one of said selector means to select the associated call register, means including said information transfer conductors for registering information pertaining to said call connection on the plurality of breakdown devices in said selected call register, means connected to said information transfer conductors for maintaining information registered in said call registers, a buffer register, means responsive to the termination of a call connection for transferring the information pertaining to said call connection over said information transfer conductors to said buffer register, means for providing the charges for said call connection to said buffer register, output recorder and utilization circuitry, and means for transferring said information inclusive of said charges to said output circuitry.

6. In a telephone switching system, the combination in accordance with claim 5 wherein each of said breakdown devices comprises a gas diode an internal electrode thereof connected to one of said information transfer conductors.

7. In a telephone switching system, the combination in accordance with claim 6 wherein said individual selector means respectively associated with each of said call registers comprises an electrode externally situated adjacent each of said gas diodes in said associated call register.

8. In a telephone switching system having a plurality of trunk circuits, individual trunk registers associated with each of said trunk circuits for registering information pertaining to the establishment of a call connection over the associated trunk circuit, a buffer register, means responsive to the termination of a call connection over a trunk circuit for transferring the information registered in the trunk register associated with said trunk circuit to said buffer register and for registering additional information in said buffer register pertaining to the termination of said call connection, charge computation means for translating information pertaining to the establishment and termination of a call connection into charges for said call connection, means responsive to the registration in said buffer register of information pertaining to the establishment and termination of a call connection for providing said information to said charge computation means, means for registering said charges for said call connection in said buffer register, output means, and means for providing said information registered in said buffer register inclusive of said charges to said output means.

9. In a telephone switching system having a plurality of trunk circuits, individual trunk registers associated with each of said trunk circuits for registering information pertaining to a call connection over the associated trunk circuit, said information including the identification of the calling and called lines and the time of completion of the call connection therebetween, information transfer means common to each of said trunk registers, means operative in response to the termination of a call connection over one of said trunk circuits for reading out on said information transfer means the information registered in the individual trunk register associated with said one trunk circuit, buffer register means connectable to said information transfer means for registering information read out on said information transfer means, means operative in response to the termination of a call connection over one of said trunk circuits for registering the time of termination of said call connection in said buffer register means, call connection charge computation means, output information recording and utilization means, information transfer means for selectively interconnecting said buffer register means with said charge computation means and with said output means.

10. In a telephone switching system, a plurality of call register circuits each for registering information pertaining to the establishment of an individual call connection, a clock circuit, means including said clock circuit for selectively registering additional information in individual of said call register circuits pertaining to the establishment of said call connections, a plurality of buffer register circuits, information transfer means for selectively interconnecting individual of said call register circuits with individual of said buffer register circuits to transfer said information and said additional information from said individual call register circuit to said individual buffer register circuit, means including said clock circuit for selectively registering information in individual of said buffer register circuits pertaining to the termination of said call connections, means for determining the charges for a call connection and for registering said charges in the individual one of said buffer register circuits in which the information pertaining to the establishment and termination of said call connection is registered, and means selectively connectable to individual of said buffer register circuits for contiguously recording all of the information inclusive of charges pertaining to an individual call connection.

11. In a telephone switching system, a plurality of connecting circuits for establishing call connections between calling and called lines, a plurality of call register circuits individually associated with respective ones of said connecting circuits, first information transfer conductors interconnecting said call register circuits, means for providing information on said first information transfer conductors pertaining to the establishment of a call connection over one of said connecting circuits, means for selectively registering said information in the individual call register circuit associated with said one connecting circuit, a plurality of buffer register circuits, means operative for providing charges for individual call connections, output register means, second and third information transfer conductors interconnecting said buffer register circuits, said call connection charge providing means and said output register means, transfer connector means operative to interconnect said first and said second information transfer conductors, means responsive to the termination of a call connection over one of said connecting circuits for reading out the information registered in said call register circuit associated with said one connecting circuit and for providing said information on said first information transfer conductors, means responsive to said reading out means for operating said transfer connector means to provide said information on said second information transfer conductors, means for selectively registering said information in one of said buffer registers, means for providing said information registered in said one buffer register over said second information transfer conductors to said charge providing means and for operating said charge providing means, said charge providing means providing the charge for said call connection on said third information transfer conductors, means for selectively registering said charge in said one buffer register, and means for transferring said information and said charge registered in said one buffer register over said second and third information transfer conductors to said output register means.

12. In a telephone switching system, a plurality of lines, means including a plurality of connecting circuits for establishing call connections between said lines, individual register meas each associated with one of said connecting circuits and responsive to the initiation of a call connection over said associated connecting circuit for registering the identities of the calling and called lines, means operative in response to the establishment of a call connection over a connecting circuit for registering answer time information in said individual register means associated with said connecting circuit, a plurality of buffer registers, means operative in response to the termination of a call connection over a connecting circuit for transferring the said calling and called line identities and said answer time information from said individual register means associated with said connecting circuit to a selected one of said plurality of buffer registers, means operative in response to the termination of a call connection for registering disconnect time information in said selected buffer register, means for translating said calling and called line identities and said answer and disconnect time information pertaining to a call connection into charges for said call connection, means for registering said charges for said call connection in said selected buffer register, output means, and means operative in response to the registration of said charges in said selected buffer register for transferring said calling and called line identities, said answer and disconnect time information and said charges to said output means.

13. In a telephone switching system having a plurality or trunk circuits, an individual register circuit connected to each of said trunk circuits for registering initial information pertaining to the establishment of a single call connection over said trunk circuit connected thereto, said initial information including the identities of the calling and called lines, clock circuit means responsive to the establishment of a call connection over one of said trunk circuits for registering an indication of the time and date selectively in said register circuit connected to said one trunk circuit, means for maintaining said initial information and said time and date indication registered in said register circuit for the duration of the call connection over said one trunk circuit, buffer register circuitry, means operative upon termination of said call connection over said one trunk circuit for transferring said initial information and said time and date indication from said one register circuit to said buffer register circuitry, means including said clock circuit means responsive to the termination of said call connection for registering an indication of the time and date in said buffer register circuitry, a translator circuit, means including said translator circuit for determining the charges for said call connection and for registering said charges in said buffer register circuitry, call charge communication equipment, and means for transferring said initial information, said time and date indications and said charges from said buffer register circuitry to said call charge communication equipment.

14. In a telephone switching system, a plurality of call registers each for registering information pertaining to the establishment of an individual call connection, a clock circuit for providing a continuous indication of time and date, buffer register circuitry common to each of said call registers, first information transfer busses interconnecting each of said call registers, said clock circuit and said buffer register circuitry, means including said clock circuit responsive to the initiation of a call connection for providing information pertaining to said call connection on said first information transfer busses, means for selectively registering said information provided on said first busses in one of said call registers, means responsive to the termination of said call connection for transferring said information pertaining to said call connection from said one call register over said first information transfer busses to said buffer register circuitry, means including said clock circuit responsive to the termination of said call connection for registering additional information pertaining to said call connection in said buffer register circuitry, second information transfer busses connected to said buffer register circuitry, means for providing said information and said additional information registered in said buffer register circuitry on said first and second information transfer busses, translator means connected to said first and second information transfer busses and operative in response to said information and said additional information for providing the charges for said call connection over said second information transfer busses to said buffer register circuitry, means for registering said charges in said buffer register circuitry, a recorder, an operator's position circuit, charge communication equipment, and means for selectively providing said information, said additional information and said charges registered in said buffer register circuitry to said recorder, to said operator's position circuit and to said charge communication equipment.

15. In a telephone switching system, substation equipment including a calling line and charge communication receiving equipment, a plurality of trunk circuits, means for establishing a call connection over one of said trunk circuits between said calling line and a called line, a plurality of trunk register circuits individually connected to respective ones of said trunk circuits and individually operative to register information provided thereto, means operative incident to the establishment of a call connection from said calling line over one of said trunk circuits for providing information pertaining to said call connection in parallel to each of said trunk register circuits, said information including the identity of said calling line and an indication that the charges for a call connection from said line are to be transmitted to said charge communication receiving equipment upon termination of said call connection, means for operating the individual trunk register circuit connected to said one trunk circuit to register said information therein, a buffer register circuit, means operative upon termination of said call connection for transferring said information and additional information pertaining to said call connection to said buffer register circuit, means for translating said information and said additional information into charges for said call connection and for registering said charges in said buffer register circuit, charge communication transmitting equipment operatively linked to said receiving equipment in said substation equipment, and means responsive to said indication in said information for providing said information inclusive of said charges to said transmitting equipment and for operating said transmitting equipment.

No references cited.

KATHLEEN H. CLAFFY, *Primary Examiner.*

H. ZELLER, *Assistant Examiner.*